US008743434B2

(12) United States Patent
Tomita

(10) Patent No.: US 8,743,434 B2
(45) Date of Patent: Jun. 3, 2014

(54) IMAGE FORMING APPARATUS INCREASING COMBINED-COLOR REPRODUCTION ACCURACY AND STABILIZING TONER DISPOSITION AMOUNT

(75) Inventor: Kentaroh Tomita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 37 days.

(21) Appl. No.: 13/640,595

(22) PCT Filed: May 10, 2011

(86) PCT No.: PCT/JP2011/061129
§ 371 (c)(1), (2), (4) Date: Oct. 11, 2012

(87) PCT Pub. No.: WO2011/142472
PCT Pub. Date: Nov. 17, 2011

(65) Prior Publication Data
US 2013/0027722 A1 Jan. 31, 2013

(30) Foreign Application Priority Data
May 13, 2010 (JP) ................................ 2010-111463

(51) Int. Cl.
*H04N 1/60* (2006.01)

(52) U.S. Cl.
USPC .......................................... 358/504; 358/518

(58) Field of Classification Search
None
See application file for complete search history.

(56) References Cited

U.S. PATENT DOCUMENTS 5,689,350 A * 11/1997 Rolleston ..................... 358/504
2010/0296139 A1 11/2010 Nishida

FOREIGN PATENT DOCUMENTS

JP 10-031333 2/1998
JP 2001-343827 12/2001
JP 2005-217747 8/2005
JP 2011-059532 3/2011

OTHER PUBLICATIONS

International Search Report issued Aug. 16, 2011 in PCT/JP2011/061129 filed May 10, 2011.

* cited by examiner

*Primary Examiner* — Scott A Rogers
(74) *Attorney, Agent, or Firm* — Harness, Dickey & Pierce, P.L.C.

(57) ABSTRACT

An image forming apparatus includes a control unit configured to perform, if a suitable color measurement area suitable for color measurement of a combined color is found in an image, a color-reproduction-accuracy increasing process while, if not, to perform a deposition-amount stabilizing process. In the color-reproduction-accuracy increasing process, a control parameter is adjusted so as to reduce a difference between a result of the color measurement on the suitable color measurement area and a desired color. In the deposition-amount stabilizing process, a plurality of test primary-color toner images are formed by an image forming unit, and a control parameter for the image forming unit are adjusted so as to reduce a difference between each of results of toner deposition amount measurement on the test primary-color toner images and a corresponding target deposition amount.

7 Claims, 10 Drawing Sheets

IMAGE FORMING APPARATUS INCREASING COMBINED-COLOR REPRODUCTION ACCURACY AND STABILIZING TONER DISPOSITION AMOUNT

TECHNICAL FIELD

The present invention relates to an image forming apparatus, such as a copier, a facsimile machine, or a printer.

BACKGROUND ART

When printings are successively performed with an electrophotographic image forming apparatus, an amount of charge on toner in a developer stored in a developing device can be changed greatly, resulting in deviation of a developing density. More specifically, a toner concentration in the developer stored in the developing device is kept within a predetermined range by supplying toner according to a drop in the toner concentration resulting from development. The amount of charge on the toner supplied into the developing device gradually increases as the toner is mixed and stirred with carrier particles in the developer; however, immediately after the toner has been supplied, the amount of charge on the toner is not sufficient. When such toner is supplied in a large amount, toner charge-to-mass ratio (Q/M) of the developer becomes relatively small, causing an amount of toner particles that are deposited on an electrostatic latent image, which is at a predetermined charge potential on a latent-image carrier, to increase. As a result, the developing density increases. Meanwhile, when images having a low image-area ratio are successively printed, a condition where only a small amount of toner is supplied to the developer continues long, causing a large part of toner in the developer to be retained while being stirred in the developing device for a long period of time. This makes the toner charge-to-mass ratio (Q/M) of the developer relatively large, causing an amount of toner particles that are deposited on an electrostatic latent image, which is at the predetermined potential on a latent-image carrier, to decrease. As a result, the developing density decreases. Such an increase or decrease in the developing density results in deviation of the developing density.

An image forming apparatus disclosed in Japanese Patent Application Laid-open No. 2001-343827 is configured to reduce deviation of the developing density by performing a toner supply process and a deposition-amount stabilizing process discussed below. The toner supply process is performed by supplying toner to a developing device according to difference between a toner concentration in a developer in the developing device measured with a toner concentration sensor and a predetermined control target value so that the toner concentration is kept within a predetermined range. The deposition-amount stabilizing process is performed in parallel with the toner supply process as follows. During successive printings, each time a predetermined number of sheets are printed out, a test toner image is formed on a photosensitive element serving as a latent-image carrier and an optical sensor measures a toner amount per unit area on the test toner image. If the measured deposition amount is greater than a target deposition amount, or, put another way, if a developing density is higher than a target value, the control target value of the toner concentration in the developer is lowered to lower the toner concentration. This causes carrier particles to rub against individual toner particles more actively and hence increases the toner charge-to-mass ratio (Q/M), thereby lowering the developing density toward the target density. On the other hand, if the measured deposition amount is smaller than the target deposition amount, or, put another way, if the developing density is lower than the target value, the control target value of the toner concentration in the developer is increased to increase the toner concentration. This causes carrier particles to rub against individual toner particles less actively and hence decreases the toner charge-to-mass ratio (Q/M), thereby increasing the developing density toward the target density.

By performing the deposition-amount stabilizing process in this way, deviation of the developing density can be reduced. When a color image forming apparatus including a plurality of developing devices that perform developing with different color toners employs the deposition-amount stabilizing process discussed above to stabilize toner deposition amounts on a color-by-color basis, the image forming apparatus can stably produce printouts where colors do not vary widely among the printouts.

However, this approach is disadvantageous in that combined colors are continuously printed in color tones that slightly differ from those of desired, or target colors. More specifically, colors to be reproduced by a color image forming apparatus are roughly divided into primary colors and combined colors. A primary color is a color represented by only a single toner. For instance, in a configuration where four toners of yellow (Y), magenta (M), cyan (C), and black (K) toners are used, a color represented by only one of the Y, M, C, and K toners is a primary color. In contrast, a combined color is a color represented by using two or more different toners. A combined color is reproduced by overlaying a plurality of primary-color toner images on one another; however, the approach discussed above causes a combined color to be unfavorably printed in a color tone slightly different from that of a desired color. A mixture ratio of different color toners is adjusted according to area-coverage ratios of the primary-color toner images to be overlaid; however, the difference between a reproduced color tone and a desired color tone results from accumulation of various factors and it is difficult to clearly specify the cause.

Meanwhile, the present inventors develop a novel color image forming apparatus that performs a color-reproduction-accuracy increasing process discussed below rather than the deposition-amount stabilizing process discussed above. More specifically, a toner deposition amount on a toner image depends on not only a toner concentration of a developer but also other control parameters. The control parameters include a charge potential at a latent-image carrier, a latent-image writing intensity (when a photosensitive element is used, an intensity of writing light), and a developing bias voltage. For instance, when a setting value for a control parameter related to image forming with the Y toner, which is one of the primary colors, is changed, a Y-toner deposition amount on the Y-toner image changes. Accordingly, a color tone (for instance, a combination of L*, a*, and b* values in the L*a*b* colorimetric system) of a Y-toner image on a printout also changes. A Y-parameter/color-tone equation, which is an equation expressing a relationship between the setting value for the control parameter and a color tone of the Y-toner image, can be studied in advance by performing a test printing under a fixed environmental condition including the temperature and the humidity. Similarly, an M-parameter/color-tone equation, which is an equation expressing a relationship between a setting value for a control parameter related to image forming of an M-toner image and a color tone of the M-toner image, and a C-parameter/color-tone equation, which is an equation expressing a relationship between a setting value for a control parameter related to image forming of a C-toner image and a color tone of the C-toner image can be studied in advance. As discussed above, a combined-color toner image is formed by overlaying Y-, M-, and C-toner images on one another. A parameter/color-tone equation for any combined color can be established based on the Y-, M-, and C-parameter/color-tone equations and an area-coverage ratio of the Y-, M-, and C-toner images. Furthermore, it is possible to establish, for each of various control parameters, a parameter correcting equation for calculating a correction amount based on a difference between a result of color measurement performed on an actually-printed combined-color toner image and a desired color for reduction of the difference between a printed color and the desired color. To effectuate this, the Y-, M-, and C-parameter/color-tone equations mentioned above are established and stored in a control unit in advance. Each time a predetermined number of sheets are printed out, a suitable color measurement area (area where color varies narrowly) suitable for color measurement is searched for across an overall image to be printed out based on image information. Subsequently, when the image has actually been printed, a spectrometer performs color measurement on the suitable color-measurement area on a printout; thereafter, a parameter correcting equation that allows reduction in the difference between a color measurement result and a desired color is established based on the color measurement result and the Y-, M-, and C-parameter/color-tone equations. After correction amounts for the various control parameters have been determined by using the parameter correcting equations, the control parameters are corrected to increase color reproduction accuracy.

The inventors have fabricated a test product of a color image forming apparatus that performs such a color-reproduction-accuracy increasing process to carry out test printing and found that the combined color in the suitable color measurement area in a printed image has been successfully reproduced with high accuracy. Furthermore, regarding the combined color not only in the suitable color measurement area but also in other areas, a difference between a color tone of the combined color in the printout and that of a desired color has successfully been greatly reduced.

However, the test product configured as discussed above has a disadvantage below. When an image to be printed according to an instruction from a user has great variation in color tone, there can be a situation where the image has no suitable color measurement area suitable for color measurement and therefore the color-reproduction-accuracy increasing process cannot be performed. For a small amount of printing such as printing of several sheets, the situation where the color-reproduction-accuracy increasing process cannot be performed will not pose a serious problem. However, if the situation where the color-reproduction-accuracy increasing process cannot be performed is kept for successive printings of dozens of sheets, color tone of the printouts can be disturbed greatly. By forming a predetermined combined-color toner image for color measurement on recording paper to perform color measurement of the combined-color toner image rather than searching an image on a printout produced according to a request from a user for a suitable color measurement area to perform color measurement, the color-reproduction-accuracy increasing process can be certainly performed irrespective of a type of an image formed according to a request from a user. However, with this configuration, a test printout, on which a combined-color toner image for color measurement is formed, is produced in addition to printouts produced according to an instruction from a user. Accordingly, this configuration forces a user to sort out the test printout. Such a sorting operation is considerably burdensome and therefore it is substantially impracticable to employ the configuration in which the test printout on which a combined-color toner image is produced for color measurement.

DISCLOSURE OF INVENTION

It is an object of the present invention to at least partially solve the problems in the conventional technology.

According to an aspect of the present invention, there is provided an image forming apparatus including: an image forming unit that forms multiple primary-color toner images of different primary colors on a surface of a single image carrier or forms primary-color toner images of different primary colors individually on surfaces of a plurality of image carriers; a transfer unit that brings a contact member into contact with any one of the single image carrier and the plurality of image carriers to create a transfer nip to transfer the multiple primary-color toner images formed on the single image carrier or the primary-color toner images individually formed on the surfaces of the plurality of image carriers on any one of a surface of the contact member and a recording sheet held on the surface of the contact member, thereby obtaining a toner image including a combined-color; and a control unit that controls driving operations of the image forming unit and the transfer unit and performs predetermined computations. The control unit includes: an area searching unit that searches an image represented by an image information for a suitable color measurement area suitable for color measurement; a color measuring unit that performs color measurement on the combined-color toner image formed on the one of the contact member and the recording sheet based on the image information; and a deposition-amount detecting unit that measures a toner deposition amount per unit area on each of the primary-color toner images formed by the image forming unit. The control unit is configured to perform, if the area searching unit has successfully found the suitable color measurement area, a color-reproduction-accuracy increasing process of adjusting a control parameter for the image forming unit so as to reduce a difference between a result of color measurement performed by the color measuring unit and a desired color to thereby increase combined-color reproduction accuracy, while, if the area searching unit has failed to find the suitable color measurement area, to perform a deposition-amount stabilizing process of causing the image forming unit to form a plurality of test primary-color toner images and adjusting a control parameter for the image forming unit so as to reduce a difference between a toner deposition amount on each of the test primary-color toner images measured by the deposition-amount detecting unit and a corresponding target deposition amount to thereby stabilize the toner deposition amount.

The above and other objects, features, advantages and technical and industrial significance of this invention will be better understood by reading the following detailed description of presently preferred embodiments of the invention, when considered in connection with the accompanying drawings.

BEST MODE(S) FOR CARRYING OUT THE INVENTION

Exemplary embodiments of the present invention will be described below. An electrophotographic color copier (hereinafter, simply referred to as "copier") is exemplified as a color image forming apparatus according to an embodiment of the present invention.

Figure 1:
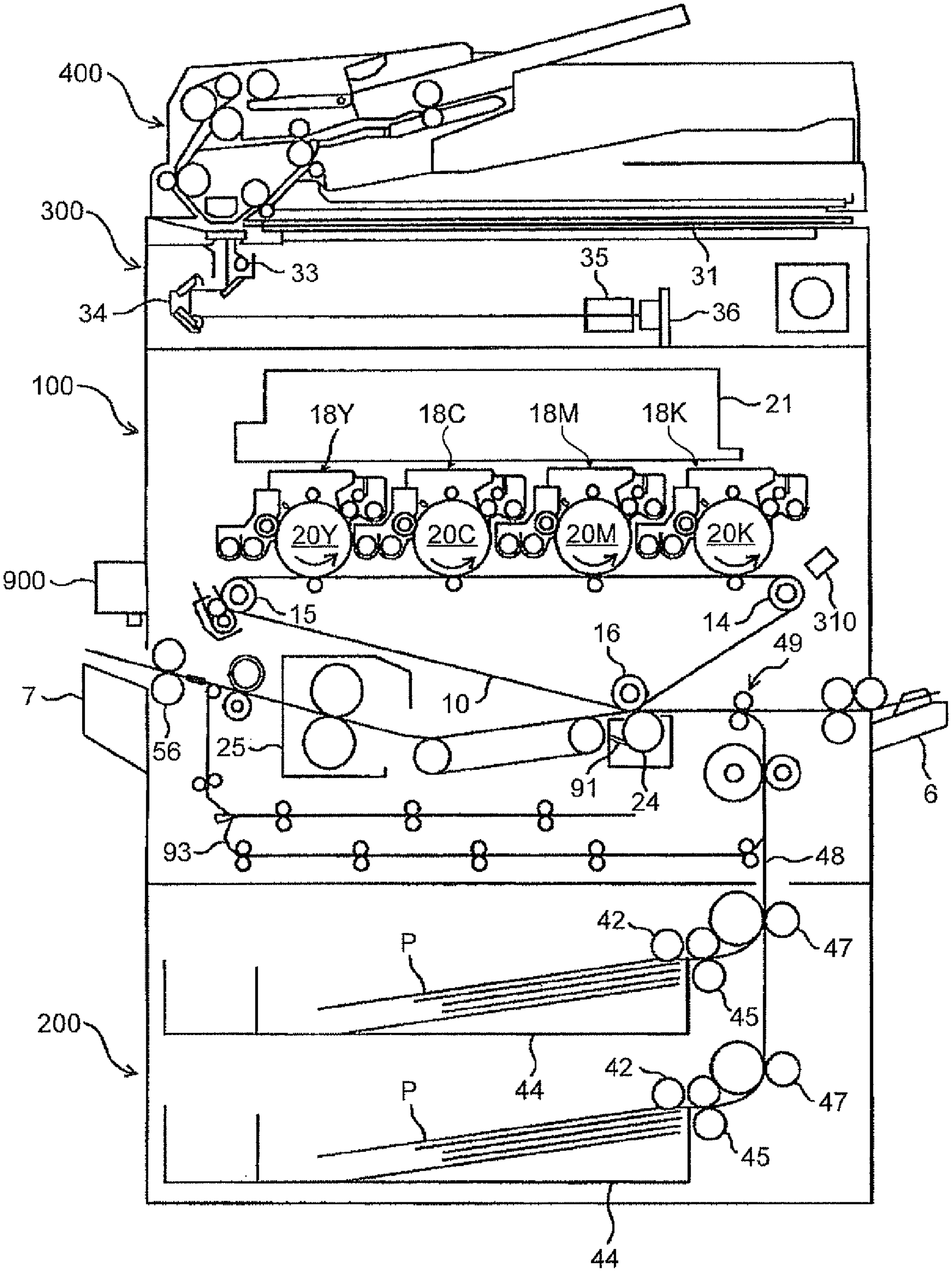
FIG. 1 is a schematic configuration diagram illustrating a copier according to an embodiment of the present invention.

A basic configuration of the copier according to the embodiment will be described below. FIG. 1 is a schematic configuration diagram illustrating the copier according to the embodiment. The copier includes a printer unit 100 that forms an image, a paper feeder 200 that feeds recording paper P, or recording sheets, to the printer unit 100, a scanner 300 mounted on the printer unit 100, and an automatic document feeder (ADF) 400 mounted on the scanner 300.

To produce a copy of an original with the copier according to the embodiment, a bundle of unbound sheets of the original is placed on a document table 30 of the automatic document feeder 400. To produce a copy of a bound original, the original is placed on an exposure glass 31 of the scanner 300 rather than in the automatic document feeder 400. More specifically, the automatic document feeder 400 is opened to expose the exposure glass 31; after the original is placed on the exposure glass 31, the automatic document feeder 400 is closed to press the original. Thereafter, in a case where the original is placed in the automatic document feeder 400 and when a start switch (not shown) is pressed by a user, the original is automatically conveyed onto the exposure glass 31. When a copy job is started, the scanner 300 drives a first carriage 33 to cause light emitted from a light source on the first carriage 33 to be reflected from a surface of the original on the exposure glass 31, reflected from a mirror on a second carriage 34 and guided through an image forming lens 35 to a reading sensor 36. Image information pertaining to the original is read in this manner. The obtained image information is fed to the printer unit 100. The printer unit 100 produces a printout of an image based on the image information obtained by scanning performed by the scanner 300. An image may be formed based on not only image information obtained by scanning but also image information fed from a personal computer or the like.

The paper feeder 200 includes a plurality of paper cassettes 44 containing recording paper P, paper feeding rollers 42 and separation rollers 45 that pick up and feed the recording paper in the paper cassette 44 one sheet at a time, and conveying rollers 47 that convey the picked-up recording paper along a paper feed path 46. The paper feed path 46 is connected to a conveying path 48 in the printer unit 100. When the start switch (not shown) is pressed by a user or when image information is fed to the printer unit 100, the paper feeding roller 42, for recording paper P selected by the user, in the paper feeder 200 is rotated to take out the recording paper P from one of the paper cassettes 44. The taken out recording paper P is separated into one sheet and conveyed into the paper feed path 46 by the separation rollers 45, and conveyed by the conveying roller 47 to the conveying path 48 in the printer unit 100.

Figure 2:
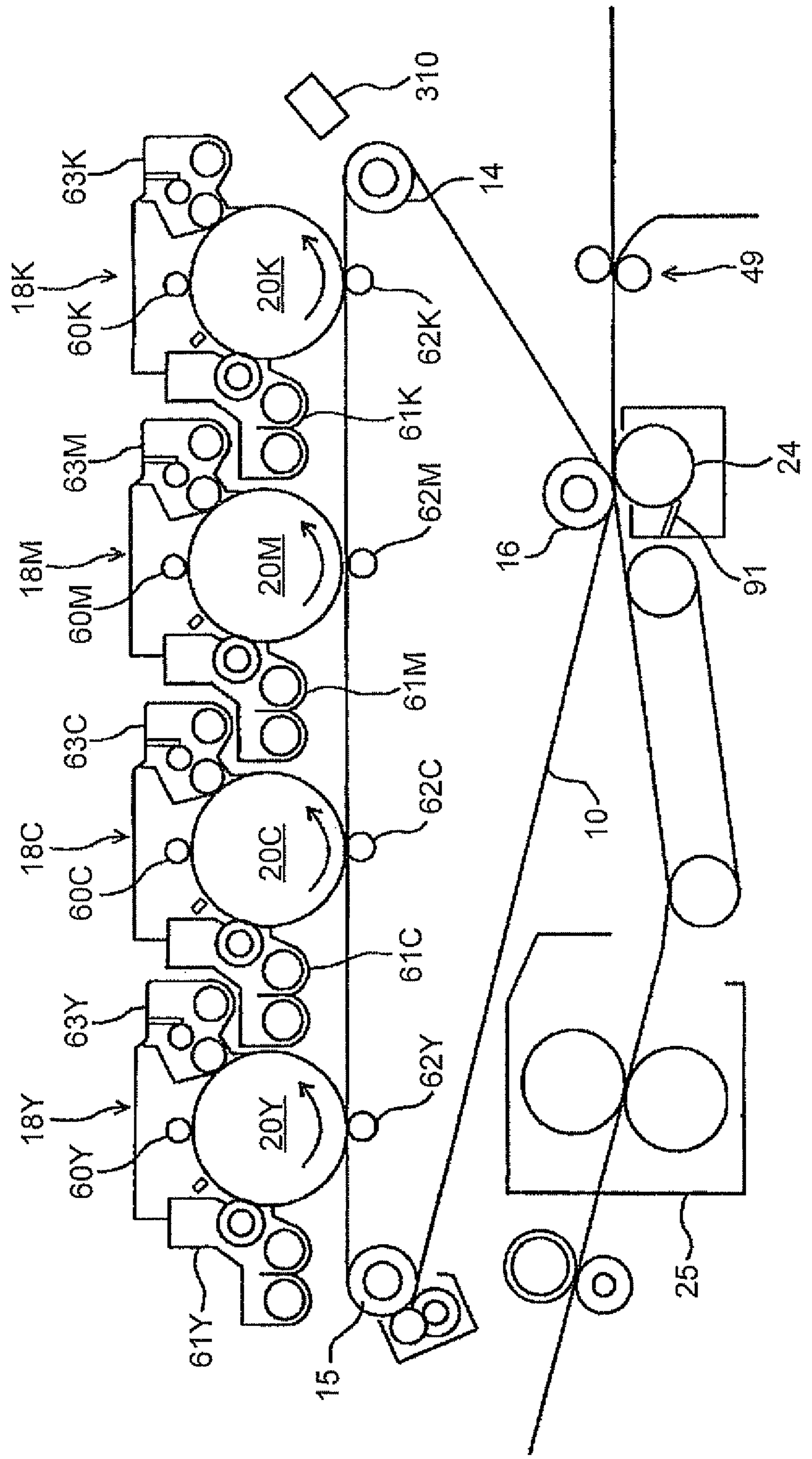
FIG. 2 is an enlarged configuration diagram illustrating a main portion in a casing of a printer unit in the copier.

FIG. 2 is an enlarged configuration diagram illustrating a main portion in a casing of the printer unit 100. The printer unit 100 including a manual feed tray 6 used to manually feed the recording paper P and a discharging tray 7 where the recording paper P having undergone image forming and discharged out of the casing of the printer unit 100 is stacked includes an endless intermediate transfer belt 10 serving as an intermediate transfer member. Examples of a base substrate of the intermediate transfer belt 10 include polyimide (PI) that exhibits considerably excellent mechanical strength and therefore is capable of reducing misregistration resulting from belt stretching. Carbon is dispersed in the base substrate as a resistance modifier so that stable transfer characteristics are constantly attained independent of the temperature/humidity environment. Accordingly, the intermediate transfer belt is tinged with black. For cost reduction, polyvinylidene difluoride (PVDF) where carbon is not dispersed can alternatively be used as the material of the belt.

The intermediate transfer belt 10 is supported on a first support roller 14, a second support roller 15, and a third support roller 16 provided inside a loop so that a shape of the intermediate transfer belt 10 viewed from a side is an inverted triangle. A portion, of the intermediate transfer belt 10 supported in the shape of the inverted triangle, corresponding to a top side of the inverted triangle extends substantially horizontally. Hereinafter, this portion is referred to as a horizontally-supported portion. The intermediate transfer belt 10 is endlessly rotated clockwise of FIG. 2 by rotation of any one of the three support rollers 14, 15, and 16.

Four image forming units, or, more specifically, an image forming unit 18Y, an image forming unit 18C, an image forming unit 18M, and an image forming unit 18K for individually forming a yellow (Y) toner image, a cyan (C) toner image, a magenta (M) toner image, and a black (K) toner image, respectively, are arranged above the intermediate transfer belt 10 along the horizontally-supported portion of the intermediate transfer belt 10. A latent-image writing unit 21 is provided further above the image forming units 18Y, 18C, 18M, and 18K as illustrated in FIG. 1. The latent-image writing unit 21 receives, at a writing control unit of the latent-image writing unit 21, image information obtained by scanning performed by the scanner 300 or image information fed from an external personal computer or the like. The latent-image writing unit 21 drives semiconductor lasers for Y, C, M, and K individually based on the image information to cause the semiconductor lasers to emit writing light for Y, C, M, and K. Photosensitive elements 20Y, 20C, 20M, and 20K in the image forming units 18Y, 18C, 18M, and 18K are scanned with the writing light so that electrostatic latent images are formed on the photosensitive elements 20Y, 20C, 20M, and 20K. Note that the light source for the writing light is not limited to the semiconductor laser; a light-emitting diode (LED) or the like can be employed as the light source.

Figure 3:
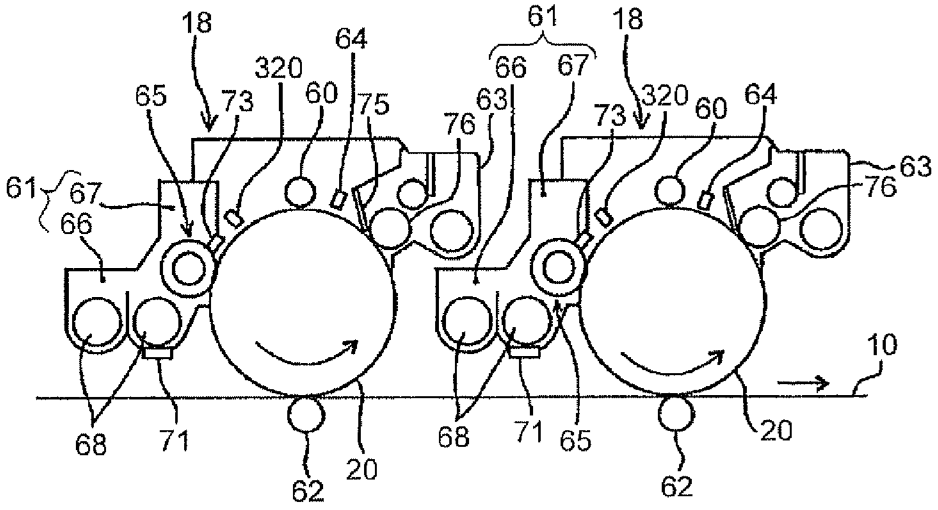
FIG. 3 is an enlarged configuration diagram illustrating adjacent two of image forming units in the printer unit.

FIG. 3 is an enlarged view illustrating adjacent two of the image forming units 18Y, 18C, 18M, and 18K. In FIG. 3, reference symbols Y, M, C, and K are omitted. The image forming unit 18 includes an electrostatically-charging device 60, a developing device 61, a photosensitive element cleaning device 63, and an electrostatic discharging device 64, which are arranged around a drum-type photosensitive element 20.

The electrostatically-charging device 60 uniformly electrostatically charges a surface of the photosensitive element 20 that is rotated counterclockwise in FIG. 2 in the same polarity as the polarity of the charge on the toner. FIG. 2 illustrates an example configuration in which the photosensitive element 20 is uniformly electrostatically charged by applying a charge bias voltage to an electrically charging roller brought to proximity of the photosensitive element 20 in a non-contact manner to thereby cause an electric discharge to occur between the photosensitive element 20 and the electrically charging roller. A contactless charging scheme with use of a contactless scorotron charger can be employed rather than such a scheme employing the electrically charging roller discussed above.

Figure 4:
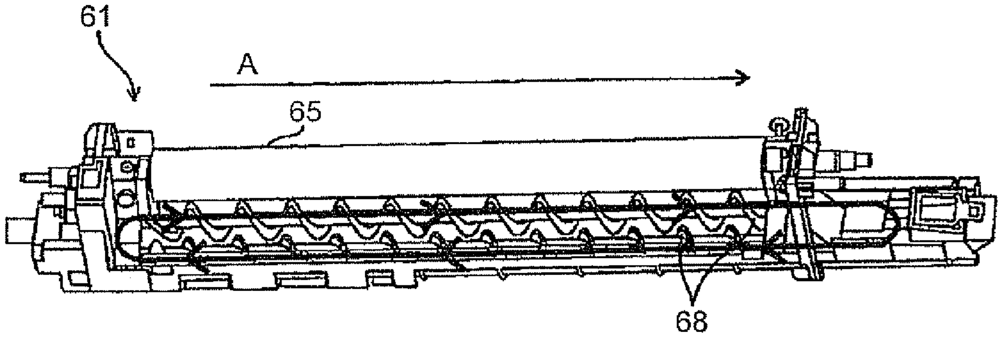
FIG. 4 is an exploded perspective view illustrating a developing device in the image forming units.

The developing device 61 develops an electrostatic latent image on the photosensitive element 20 by using a developer containing magnetic carrier and nonmagnetic toner. The developing device 61 can be roughly sectioned into a stirring unit 66 and a developing unit 67. The stirring unit 66 includes two conveying screws 68 arranged parallel with each other. The two conveying screws 68 are individually provided in separate compartments with a partition therebetween. The partition between the compartments has a notch at each of two end portions in a longitudinal direction of the screws. The two compartments housing the two conveying screws 68 separately are in communication with each other through the notches at the two end portions in the longitudinal direction of the screws. One of the two compartments adjacent to the developing unit 67, which will be described later, is a feed chamber used to supply developer to a developing sleeve 65 in the developing unit 67. The other one of the compartments is a return chamber that receives the developer at one end in the longitudinal direction of the screws and conveys the developer to the other end so that the developer is returned to the feed chamber. The conveying screw 68 in the feed chamber and the conveying screw 68 in the return chamber are configured to rotate to thereby convey developer in opposite directions, causing the developer conveyed to near the end portions in the longitudinal direction of the screws to be delivered into the other chambers through the notches mentioned above. Thus, the developer is conveyed in a circulating manner to and from the feed chamber and the return chamber as indicated by an arrow in FIG. 4. A toner concentration sensor 71 that detects a toner concentration of the developer is attached to a bottom of the feed chamber in the stirring unit 66 as illustrated in FIG. 3.

The developing unit 67 houses the developing sleeve 65 made of a rotatable, nonmagnetic pipe. A magnet roller having a plurality of circumferentially-arranged magnetic poles is provided in the developing sleeve 65 and fixed there in a manner that the magnet roller is not rotated even when the developing sleeve 65 rotates. In the feed chamber of the stirring unit 66 mentioned above, the developer is conveyed in a direction indicated by arrow A in FIG. 4 by rotation of the conveying screw 68 while the toner concentration sensor 71 detects a toner concentration of the developer. A part of the developer is lifted up into the developing sleeve 65 by a magnetic force exerted by the magnet roller. The developer lifted up into the developing sleeve 65 is conveyed by rotation of the developing sleeve 65 to a developing area facing the photosensitive element 20 illustrated in FIG. 3. On the way to the developing area, a doctor blade 73 regulates a thickness of the developer on the sleeve. After having undergone the thickness regulation and then reached the developing area, a development potential causes toner particles in the developer to transfer from magnetic carriers onto a latent image on the photosensitive element 20. The development potential is a voltage difference between the developing sleeve 65, onto which the developing bias voltage of the same polarity as the polarity of the charge on the toner is applied, and the latent image. The electrostatic latent image on the photosensitive element 20 is thus developed.

When the developer that has passed through the developing area is further conveyed by rotation of the developing sleeve 65 to a position of a repulsive magnet pole in the magnet roller, the developer is released from the surface of the developing sleeve 65 and returned into the feed chamber in the stirring unit 66. In the feed chamber, as the developer used in developing is returned to the feed chamber, the toner concentration in the developer decreases. This decrease in toner concentration is detected by the toner concentration sensor 71 to supply an appropriate amount of toner to the feed chamber. The toner supply control is performed each time a single sheet is processed.

A primary transfer roller 62 is arranged inside the loop of the intermediate transfer belt 10 to face the photosensitive element 20 with the intermediate transfer belt 10 therebetween. The primary transfer roller 62 presses a front surface of the intermediate transfer belt 10 against the photosensitive element 20, thereby forming a primary transfer nip where the front surface of the belt and the photosensitive element 20 are in contact with each other. A primary transfer voltage of the polarity opposite the polarity of the charge on the toner is applied onto the primary transfer roller 62. This causes a toner image on the surface of the photosensitive element 20 to be primary-transferred onto the front surface of the intermediate transfer belt 10 in the primary transfer nip. As a primary transfer unit that transfers a toner image on the photosensitive element 20 onto the front surface of the intermediate transfer belt 10, a transfer brush, a contactless corona charger, or the like may be employed in lieu of the primary transfer roller 62.

Transfer-residual toner having not been primary-transferred onto the intermediate transfer belt 10 remains deposited on the surface of the photosensitive element 20 that has passed through the primary transfer nip. The photosensitive element cleaning device 63 removes this transfer-residual toner from the surface of the photosensitive element 20. The photosensitive element cleaning device 63 supports a cleaning blade 75 made of a polyurethane rubber at one end of the cleaning blade 75. The photosensitive element cleaning device 63 scrapes off the transfer residual toner from the surface of the photosensitive element 20 by bringing the other, free end of the cleaning blade 75 into contact with the surface. A conductive fur brush 76 that rotates while being in contact with the photosensitive element 20 also removes the transfer residual toner from the surface of the photosensitive element 20. The toner removed from the surface of the photosensitive element 20 by the cleaning blade 75 and the fur brush 76 is stored in the photosensitive element cleaning device 63.

The surface of the photosensitive element 20, from which the transfer residual toner has been removed in the photosensitive element cleaning device 63, is illuminated by the electrostatic discharging device 64 to eliminate the electrostatic charge on the surface. This places the surface potential of the photosensitive element 20 in an initial state. Thereafter, after the surface of the photosensitive element 20 is uniformly electrostatically charged by the electrostatically-charging device 60 in the same polarity as the polarity of the charge on the toner, a potential sensor 320 detects the surface potential.

The photosensitive element 20 that is 60 mm in diameter is rotated counterclockwise in FIG. 3 at a linear velocity of 282 mm/sec. The developing sleeve 65 that is 25 mm in diameter is rotated at a linear velocity of 564 mm/sec. An amount of charge on the toner in the developer in the developing device 61 to be supplied to the developing area is approximately in a range from −10 to −30 μC/g. A thickness of a photosensitive layer on the photosensitive element 20 is 30 μm; the beam spot diameter and a power of a laser beam emitted from an optical system of the latent-image writing unit 21 is 50×60 μm and approximately 0.47 mW, respectively. The surface of the photosensitive element 20 is uniformly electrostatically charged by the electrostatically-charging device 60 to, for instance, −700 V; the electrostatic potential at a portion of an electrostatic latent image irradiated with the laser beam emitted from the latent-image writing unit 21 becomes −120 V. The developing bias voltage applied to the developing sleeve 65 is −470 V. Accordingly, a developing potential of −350 V acts on the toner on the electrostatic latent image on the photosensitive element 20.

In the image forming unit 18 configured as discussed above, the photosensitive element 20 is, during being rotated, uniformly electrostatically charged by the electrostatically-charging device 60 first, and thereafter optically scanned by the latent-image writing unit 21, which causes the photosensitive element 20 to carry an electrostatic latent image thereon. This optical scanning is performed based on image information read by the scanner 300 or image information fed from a personal computer or the like. The electrostatic latent image on the photosensitive element 20 is developed by the developing device 61 into a toner image. The toner image is primary-transferred onto the intermediate transfer belt 10 by the primary transfer roller 62. Transfer residual toner left on the surface of the photosensitive element 20 after the primary transfer is removed by the photosensitive element cleaning device 63. Thereafter, the surface of the photosensitive element 20 undergoes electrostatic discharging performed by the electrostatic discharging device 64 to become ready for a subsequent image forming process.

As illustrated in FIG. 2, a secondary transfer roller 24 is provided outside the loop of the intermediate transfer belt 10. The intermediate transfer belt 10 is pinched between the secondary transfer roller 24 and the third support roller 16, which is inside the belt loop. The third support roller 16 presses the intermediate transfer belt 10 against the secondary transfer roller 24, thereby forming a secondary transfer nip where the front surface of the belt and the secondary transfer roller 24 are in contact with each other.

When the start switch (not shown) is pressed by a user, a drive motor (not shown) is driven to rotate one of the support rollers 14, 15, and 16, which in turn rotates the intermediate transfer belt 10. Concurrently, the photosensitive elements 20Y, 20C, 20M, and 20K of the image forming units 18Y, 18C, 18M, and 18K are also rotated. Thereafter, the latent-image writing unit 21 emits writing light to the photosensitive elements 20Y, 20C, 20M, and 20K of the image forming units 18Y, 18C, 18M, and 18K based on the image information read with the reading sensor 36 of the scanner 300. As a result, an electrostatic latent image is formed on each of the photosensitive elements 20Y, 20C, 20M, and 20K. The electrostatic latent images are developed by the developing devices 61Y, 61C, 61M, and 61K. Hence, a Y-toner image, a C-toner image, an M-toner image, and a K-toner image are formed on the photosensitive elements 20Y, 20C, 20M, and 20K. The formed Y-, C-, M-, and K-toner images are primary-transferred onto the intermediate transfer belt 10 in primary transfer nips for yellow, cyan, magenta, and black to be overlaid on one another. Thus, four-color overlaid toner image, in which toner images of respective colors are overlaid on one another, is formed on the intermediate transfer belt 10.

The recording paper P fed out from the paper feeder 200 mentioned above is conveyed into the conveying path 48 in the printer unit 100, and thereafter stopped at a position where the recording paper P abuts on a pair of registration rollers 49. The pair of registration rollers 49 receives the recording paper P on the conveying path 48 and feeds out the recording paper P to the secondary transfer nip at a timing causing the recording paper P to be synchronized with the four-color overlaid toner image on the intermediate transfer belt 10. Secondary transfer onto the recording paper P, which has been conveyed into the secondary transfer nip, is collectively performed on the recording paper P by application of a secondary transfer bias voltage to the secondary transfer roller 24. The four-color overlaid toner image becomes a full-color toner image by cooperating with a white background of the recording paper P. Thereafter, the recording paper P is conveyed to a fixing device 25 where the recording paper P receives heat and pressure for fixation of the full-color toner image. A conveying direction of the recording paper P that has passed through the fixing device 25 is switched by a flapper between a direction toward a sheet-reversing device 93 and a direction toward a pair of discharging rollers 56. If the recording paper P is conveyed into the sheet-reversing device 93, the recording paper P is turned upside down and then conveyed to the pair of registration rollers 49 again so that a full-color image is formed also on the other side of the recording paper P. If the recording paper P is conveyed to the pair of discharging rollers 56, the recording paper P is stacked on the discharging tray 7 that is provided outside the copier.

As the secondary transfer unit that secondary-transfers four-color overlaid toner image on the intermediate transfer belt 10 onto recording paper P, a transfer charger may be used in lieu of the secondary transfer roller 24. A roller cleaning unit 91 that cleans toner deposited on the secondary transfer roller 24 is in contact with the secondary transfer roller 24.

A manual paper feed path that extends from the manual feed tray 6 and merges with the conveying path 48 is provided in the printer unit 100. A paper feed roller and a separation roller for feeding the recording paper P placed on the manual feed tray 6 one sheet at a time are provided at an upstream portion of the manual paper feed path.

A line spectrometer 900 (hereinafter, referred to as "spectrometer") is provided above the discharging tray 7. The spectrometer enables color measurement on an image formed on the recording paper discharged onto the discharging tray 7. The spectrometer obtains spectral reflectance distribution (400 nm to 700 nm in increments of 10 nm) across an overall width in the main-scanning direction (210 mm in increments of 10 mm).

Figure 5:
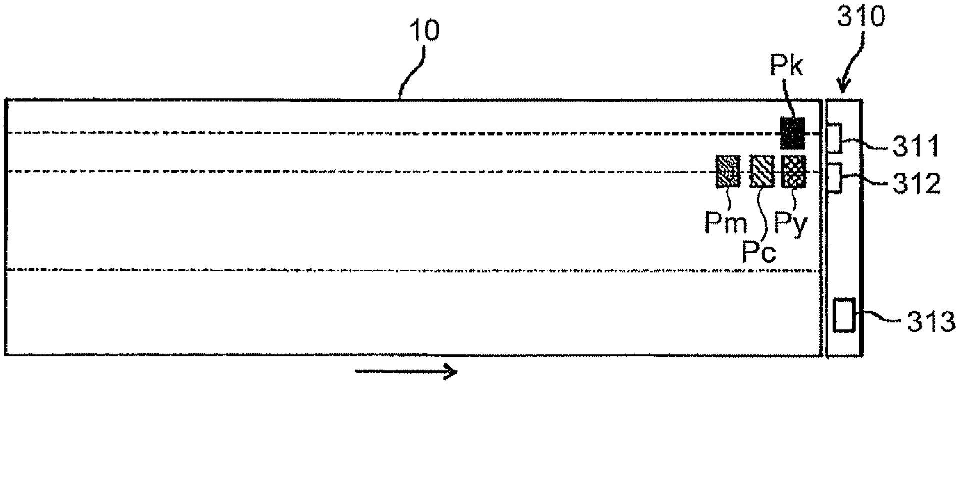
FIG. 5 is a plan view illustrating an intermediate transfer belt and an optical sensor unit in the printer unit.

An optical sensor unit 310 is provided outside the loop of the intermediate transfer belt 10 in a manner that the optical sensor unit 310 faces a portion of the intermediate transfer belt 10 supported on the first support roller 14 and is away from the intermediate transfer belt 10 by a predetermined distance. As illustrated in FIG. 5, the optical sensor unit 310 includes a first optical sensor 311 and a second optical sensor 312 arranged along a width direction of the belt. The second optical sensor 312 is located at a position closer to a center of the belt than the first optical sensor 311 is. This position closer to the center the belt corresponds to a more upstream position in a developer conveyance direction, along which the developer is conveyed by the conveying screw 68 at the developing area, indicated by arrow A in FIG. 4.

Figure 6:
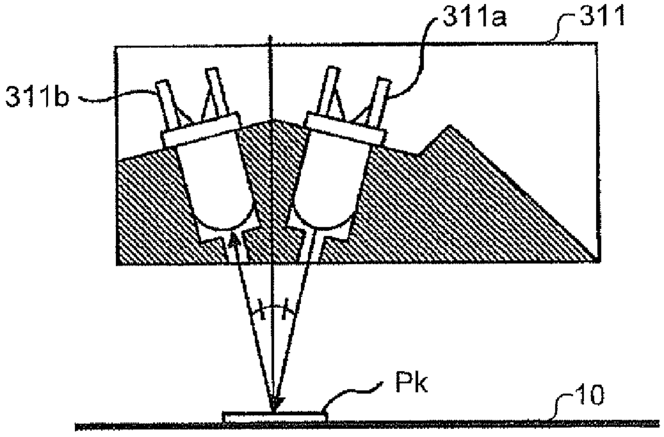
FIG. 6 is an enlarged configuration diagram illustrating a first optical sensor in the optical sensor unit.
Figure 7:
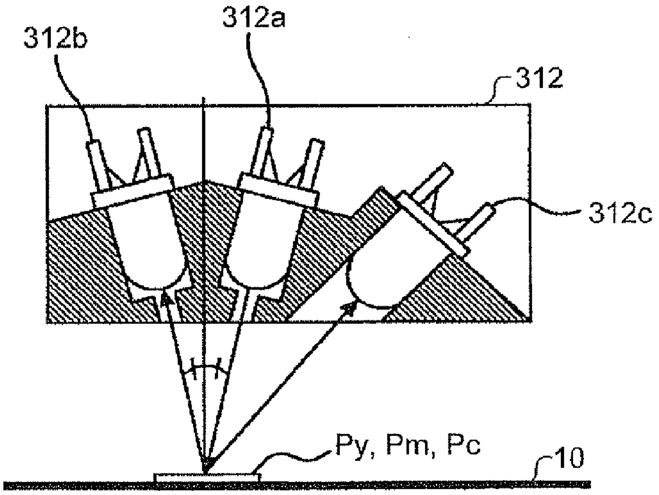
FIG. 7 is an enlarged configuration diagram illustrating a second optical sensor in the optical sensor unit.

The first optical sensor 311 measures a toner deposition amount per unit area of a K-toner patch image Pk formed on the intermediate transfer belt 10 in a deposition-amount stabilizing process, which will be described later. As illustrated in FIG. 6, the first optical sensor 311 includes a light source (LED) 311*a* that emits light toward the intermediate transfer belt 10 and a specular-reflection-light receiving element 311*b* that receives light specularly reflected from the belt. The second optical sensor 312 measures a toner deposition amount per unit area of each of a Y-toner patch image Py, a C-toner patch image Pc, and an M-toner patch image Pm formed on the intermediate transfer belt 10 in the deposition-amount stabilizing process, which will be described later. As illustrated in FIG. 7, the second optical sensor 312 includes a light source (LED) 312*a* that emits light toward the intermediate transfer belt 10, a specular-reflection-light receiving element 312*b* that receives light specularly reflected from the belt, and a diffuse-reflection-light receiving element 312*c* that receives diffuse reflection light from the belt. Each of the optical sensors uses a GaAs infrared-emitting diode whose peak emission wavelength $\lambda p$ is 950 nm, and, as a light-receiving element, an Si phototransistor whose peak receipt wavelength is 800 nm. The optical sensors are located so as to be away from the intermediate transfer belt 10, which is a measurement target surface, by a distance (detection distance) of 5 mm. The optical sensor unit 310 includes, in addition to the optical sensors, a memory 313.

Figure 8:
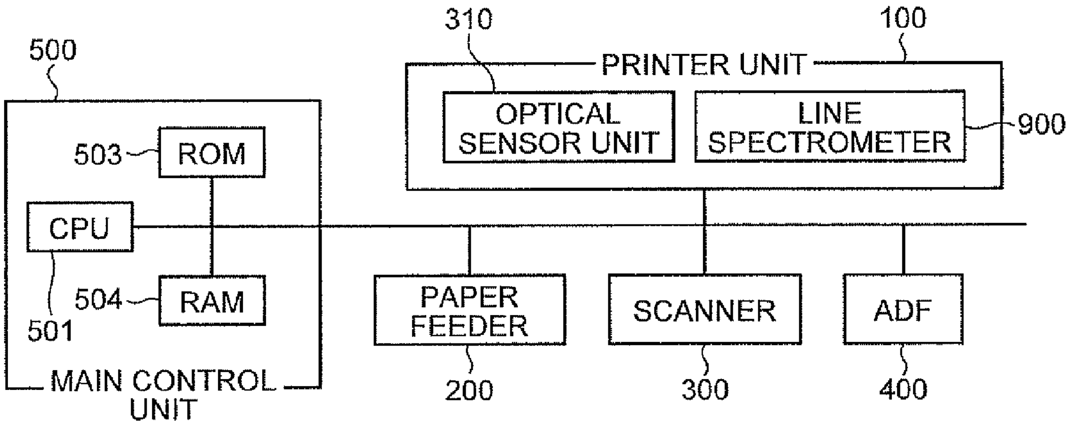
FIG. 8 is a block diagram illustrating electrical inter-unit connections in the copier.

FIG. 8 is a block diagram illustrating electrical inter-unit connections in the copier according to the embodiment. The copier includes a main control unit 500 that performs drive control of the units. The main control unit 500 includes a central processing unit (CPU) 501 that performs various computations and drive control of the units, a read only memory (ROM) 503 that stores fixed data, such as computer program instructions, and a random access memory (RAM) 504 that stores various data pieces in a rewritable manner to serve as a working area and the like, which are connected via a bus line 502. Units in the printer unit 100, the paper feeder 200, the scanner 300, and the automatic document feeder 400 are connected to the main control unit 500. The optical sensor unit 310 and the line spectrometer 900 of the printer unit 100 output measurement result information to the main control unit 500.

The main control unit 500 performs the deposition-amount stabilizing process described below. As illustrated in FIG. 5, the main control unit 500 causes the Y-, C-, M-, and K-toner patch images Py, Pc, Pm, and Pk to be formed on the intermediate transfer belt 10. The optical sensor unit 310, serving as the deposition amount detecting unit, determines toner deposition amount per unit area of each of the Y, C, M, and K toners on the Y-, C-, M-, and K-toner patch images Py, Pc, Pm, and Pk based on output of the optical sensors in response to passage of the toner patch images across a position immediately below the optical sensors. The main control unit 500 compares a calculated value of the Y-toner deposition amount against a target Y-toner deposition amount. If the calculated amount is smaller than the target amount, a target Y-toner concentration control value for use in toner supply control is increased, while if the calculated amount is greater than the target amount, the target Y-toner concentration control value is lowered. Similarly, target C-, M-, and K-toner concentration control values are corrected based on results of comparison between calculated values of the deposited C-, M-, and K-toner amount and target values for the same. By performing the deposition-amount stabilizing process to stabilize the toner deposition amount per unit area on each of the Y-, C-, M-, and K-toner images, color tones of the full-color image can be stabilized. However, this undesirably causes each of various secondary colors to be stabilized at a color slightly deviated from a desired color.

A characteristic configuration of the copier according to the embodiment is described below.

A color-reproduction-accuracy increasing process to be performed by the main control unit 500 is discussed below. This color-reproduction-accuracy increasing process is basically performed on a per-printout-sheet basis; however, there can be a situation where this process cannot be performed depending on an image printed according to a request from a user.

To perform the color-reproduction-accuracy increasing process, the main control unit 500 obtains image information fed from a user via a personal computer or the like or image information obtained by the scanner 300. The image information contains pixel values each representing lightness of a single-color component of red (R), green (G), and blue (B) for each of a plurality of pixels arranged in a matrix. The main control unit 500 converts the image information into image information containing pixel values each representing lightness of a single-color component of cyan (C), magenta (M), yellow (Y), and black (K). The main control unit 500 searches an overall area of an image pertaining to the image information for a suitable color measurement area to be subjected to color measurement. When, after this search, the printer unit 100 has discharged a printout of the image onto the discharging tray 7, the line spectrometer 900, serving as a color measuring unit, performs color measurement on the suitable color measurement area. Thereafter, the main control unit 500 compares a result of the color measurement with color data represented by the image information and corresponding to the suitable color measurement area.

How to search for the suitable color measurement area is described below. A pixel at a predetermined position in a pixel matrix represented by the image information is set as a noticed pixel. An area having the noticed pixel at its center and a predetermined size is extracted as a subarea. For instance, for first extraction, a pixel on the 51st row and on the 51st line from an upper-left corner, in the pixel matrix is set as the noticed pixel; a rectangular area of 101 pixels per side (an area of approximately 4 mm per side) where the noticed pixel is at its center is extracted as the subarea. The main control unit 500 calculates evenness index value indicating evenness in contrasting density across the entire subarea by referring to the pixel values (C, M, Y, and K) of pixels in the extracted subarea.

There are various applicable methods for calculation of the evenness index value. A first example method for calculation of the evenness index value is described below. First, a variance of pixel values is calculated for each of C, M, Y, and K. Subsequently, the evenness index value in the subarea is calculated as a sum of the variances, to which a negative sign is affixed.

A second example method can be a method that uses a determinant of a variance-covariance matrix to obtain the evenness index value. More specifically, a variance and a covariance of pixel values in the subarea are calculated for each of C, M, Y, and K. Subsequently, a variance-covariance matrix, in which diagonal elements and off-diagonal elements are the variances and the covariances, respectively, is created. Then, a determinant of the created variance-covariance matrix is calculated. A value obtained by affixing a negative sign to this determinant can be used as the evenness index value. Using the determinant of the variance-covariance matrix allows evaluation of how large the colors of the pixels are distributed in the CMYK space. This evenness index value is superior as compared with the evenness index value of the first example discussed above in allowing evaluation of a volume of distribution of different colors.

As a third example for obtaining the evenness index value, a method that utilizes frequency characteristics of colors can be used. More specifically, the pixel values in the subarea are Fourier transformed to calculate a sum of squares of absolute values of Fourier coefficients at a certain frequency. This sum, to which a negative sign is affixed, can be used as the evenness index value. A plurality of frequencies can be used as the certain frequency. When the evenness index value obtained by the first example method is used and when an image is halftone-processed, an even area in the image may be not found due to an effect of a pattern in the halftone processing to the image that has been halftone-processed. In contrast, when the third example method is employed, the evenness index value is calculated by using a sum of absolute values of Fourier coefficients at the certain frequency. Accordingly, the calculated evenness index value is unaffected by halftone processing. The evenness index value is not limited to the evenness index value calculated by one of the first to third example methods, and a known method for calculation of the evenness index value can be used.

When the evenness index value of the extracted subarea has been calculated, subsequently, whether all the subareas have been extracted (whether subarea extraction has been performed across the entire area of the image) is determined. When it is determined that there is a not-yet-extracted subarea, a position of the noticed pixel is shifted to the right by one pixel to assign a pixel on the 52nd row and on the 51st line from the upper-left corner, of the pixel matrix as the noticed pixel; a rectangular area of 101 pixels per side where the noticed pixel is at its center is extracted as a subarea. The evenness index value of colors of the extracted subarea is calculated in a similar manner. Subsequently, for extraction of each of a third, a fourth, a fifth, . . . , and an nth subareas, the position of the noticed pixel is shifted to the right by one pixel. When the position of the noticed pixel in the row direction has been shifted to a position at 51st from a right end to the left of the matrix, the position of the noticed pixel in the row direction is returned to a position at 51st from a left end to the right of the matrix and simultaneously the position in the line direction is shifted downward by one pixel. Thereafter, the operation of shifting the position of the noticed pixel to the right by one pixel is repeatedly performed. The position of the noticed pixel is shifted one by one as discussed above as in raster scanning to perform extraction across the entire image.

A method of extracting subareas in a manner that avoids edge-portion overlap of extracted subareas rather than shifting the noticed pixel by one pixel at a time can alternatively be employed. For instance, after a subarea of 101 pixels per side, in which the noticed pixel on the 51st row and on the 51st line is at its center, has been extracted, a subarea of 101 pixels per side, in which the noticed pixel on the 152nd row and on the 51st line is at its center, is extracted.

When extraction of subareas and calculation of evennesses index value have been performed across the entire image, one of all the subareas having a most favorable evenness index value is selected, and whether the evenness index value of the selected subarea is more favorable than a predetermined reference evenness is determined. If it is determined that the evenness index value is more favorable, the subarea is determined as a suitable color measurement area suitable for color measurement.

Subsequently, the main control unit 500 compares a result of color measurement and color data (hereinafter, color corresponding to this is also referred to as “target color value”) pertaining to the suitable color measurement area and represented by the image information, thereby determining correction amounts for control parameters. The control parameters to be corrected in the embodiment are a laser intensity (LDP) of the latent-image writing unit 21, an applied charge voltage (Cdc) applied by the electrostatically-charging device 60, and a developing bias voltage (Vb) of the developing device 61.

Thereafter, the control parameters (the laser intensity, the applied charge voltage, and the developing bias) are set to values corrected with the determined correction amounts.

How to determine the correction amounts for the control parameters is discussed below. The main control unit 500 uses a vector in a color space of, for instance, the L*a*b* colorimetric system to express a result of color measurement and a target color value corresponding to the result. In the color space, the vector expressing the color measurement result is a 12-dimensional vector y(k), in which L*, a*, and b* averages (an average of L*, an average of a*, and an average of b*) of each of the four colors obtained by measuring an image fixed on a kth sheet of paper are arranged; the vector expressing the target color value is a 12-dimensional vector, in which L*, a*, and b* of each of the four colors on digital image data are arranged. Hereinafter, the vector of the target color value is referred to as a target color value r0. In the discussions and mathematical expressions of this document, the symbol “*” is omitted in some cases and “L*”, “a*”, and “b*” are denoted by "L", "a", and "b". Both of "L*", "a*", and "b*" and "L", "a", and "b" indicate "L*", "a*", and "b*" of CIE 1976.

The main control unit 500 determines parameter correction amounts v(k) and parameter setting values u(k) for the image forming unit 18 and the like based on the difference between a printout value (result of color measurement) y(k) obtained by measuring, for instance, a kth printout (a kth print step) and the target color value r0. The relationship between u and y is stored in a ROM 405 in the form of the following equation using multivariable function G, variables which depends on do not include time:

$$y=G(u).$$

More specifically, stored in the ROM 405 are models G (four models in total), each representing a relationship between the setting values u for the various control parameters and the printout color y of a solid image of one of the four primary colors, the cyan (C), magenta (M), yellow (Y), and black (K) formed by corresponding one of image forming units alone. For instance, the relationship for cyan can be expressed by a quadratic equation:

$$L^*=0.00021\cdot LDP^2-0.000055\cdot Vb^2-0.0196\cdot Cdc-0.0537\cdot LDP+0.0196\cdot Vb+83.84.$$

For cyan, in addition to this equation expressing the relationship between L* and the various control parameters, an equation expressing a relationship between a* and the various control parameters and an equation expressing a relationship between b* and the various control parameters are stored in a storage unit in the copier. Similarly, three equations are also stored in the storage unit for each of yellow, magenta, and black. Here, a color that can be expressed by any one of the M, C, Y, and K toners is referred to as a primary color. In contrast, a color that can be expressed only by combining two or more of the M, C, Y, and K toners is referred to as a combined color.

Irrespective of whether the printout color y(k) is a primary color or a combined color, a printout color y(k+1) of a (k+1)th print subsequent to a kth print step (the kth sheet) can be expressed by Equation (1) below. This equation is constructed by using Taylor expansion of the multivariable function G, a printout color initial value y(1) being output value for nominal setting values u(0).

$$y(k+1)=y(k)+\left.\frac{\partial G}{\partial u}\right|_{u(k-1)}(u(k)-u(k-1)) \tag{1}$$

From this Equation (1), setting values u(k+1) for control parameters for the (k+1)th print step are obtained. To obtain parameter correction amounts v(k), which are correction amounts to be corrected from the setting values u(k) for the kth print step, Equation (1) can be described by Equation (2) below.

$$u(k)=u(k-1)+v(k) \tag{2}$$

A matrix representing a change in printout in response to a change in the control parameters u(k) is defined as a Jacobian matrix at the kth print step (the kth sheet), which expressed as Equation (3) below.

$$B(k)=\left.\frac{\partial G}{\partial u}\right|_{u(k-1)} \tag{3}$$

In Equation (3), the control parameters u in the Jacobian matrix are fixed. In the neighborhood of the fixed control parameters u, the system represented by Equation (1) can be described, as a linear time-varying system, by Equation (4), which is a state equation, below. In Equation (4), x is a state variable and d is a disturbance. This state equation is alos configured to determine the parameter correction amounts v(k) in lieu of the setting values u(k). In this state equation, I is a unit matrix.

$$x(k+1)=Ax(k)+B(k)v(k)+d(k),A=I\ y(k)=Cx(k),C=I \tag{4}$$

In particular, as the matrix B(k) is dependent on the control parameters u (k−1) at a (k−1)th print step, the matrix B(k) can be expressed by:

$$B(k)=B(u(k-1)).$$

This is a linear parameter varying (LPV) function. At every kth print step, the matrix B(k) is changed according to the control parameter setting values u(k−1) at an immediately preceding print step. This allows effective control in a system where the image forming process has a large non-linearity.

At the kth print step, the main control unit 500 determines the parameter correction amounts v(k) based on a printout value y(k) and the target value r0. According to the above-mentioned Equation (2), the parameter correction amounts v(k) are added to u(k−1) to determine the control parameters u(k) for the kth print step. An output of a (k+1)th print step is the sum of the disturbance d and an output of the resultant process.

An equation expressing the relationship between a combined color and the various control parameters is constructed as follows. From the four mathematical models, which are stored in the ROM in advance, for the primary-color solid images, a mathematical model (e.g., Equation (17) to be described later) representing a relationship between setting values for the various control parameters and a printout color, for an arbitrary color formed by combining a plurality of primary colors and measured with the line spectrometer 900, is formulated.

Modeling the system corresponds to determining a change in a printout resulting from a change in the matrix B(k), or, more specifically, a change in the control parameters. For instance, for the Y, C, M, and K primary colors, the matrix B(k) has a block diagonal form as expressed by Equation (5) below.

$$y(k+1)=y(k)+\begin{pmatrix} B^M(k) & & & 0 \\ & B^C(k) & & \\ & & B^Y(k) & \\ 0 & & & B^K(k) \end{pmatrix} v(k)+d(k) \tag{5}$$

Accordingly, systems for cyan, magenta, yellow, and black can be considered independently from one another as discussed below. Note that each of superscripts M, C, Y, and K of "$B^M$", "$B^C$", "$B^Y$", and "$B^K$" does not indicate an exponent; each superscript indicates that a symbol, to which the superscript is affixed, is a numerical value, a matrix, or the like related to a corresponding one of magenta, cyan, yellow, and black. Hereinafter, each superscript M, C, Y, or K in a mathematical expression is used to indicate that a numerical value, a matrix, or the like, to which the superscript is affixed, is of a corresponding one of magenta, cyan, yellow, and black.

$$y^M(k+1)=y^M(k)+B^M(k)v^M(k), y^C(k+1)=y^C(k)+B^C(k)v^C(k)$$

$$y^Y(k+1)=y^Y(k)+B^Y(k)v^Y(k), y^K(k+1)=y^K(k)+B^K(k)v^K(k) \quad (6)$$

$$y^M=(L^M a^M b^M)^T, u^M=(Cdc^M LDP^M Vb^M)^T,$$

$$y^C=(L^C a^C b^C)^T, u^C=(Cdc^C LDP^C Vb^C)^T,$$

$$y^Y=(L^Y a^Y b^Y)^T, u^Y=(Cdc^Y LDP^Y Vb^Y)^T,$$

$$y^K=(L^K a^K b^K)^T, u^K=(Cdc^K LDP^K Vb^K)^T, \quad (7)$$

In Equation (7), T denotes a transposition of a matrix.

L, a, and b values in the equations are given as a function of the laser intensity (LDP), the applied charge voltage (Cdc), and the developing bias (Vd) by Equation (8).

$$\begin{cases} L = L(Cdc, LDP, Vb) \\ a = a(Cdc, LDP, Vb) \\ b = b(Cdc, LDP, Vb) \end{cases} \quad (8)$$

When L, a, and b are expressed by a polynomial equation of Cdc, LDP, and Vb in this way, each of $B^M(k)$, $B^C(k)$, $B^Y(k)$, and $B^K(k)$ is a 3×3 matrix and can be described by Equation (9) below. Note that "*" in Equation (9) is a wildcard character that stands for any one of M, C, Y, and K.

$$B*(k) = \begin{pmatrix} \frac{\partial L}{\partial Cdc} & \frac{\partial L}{\partial LDP} & \frac{\partial L}{\partial Vb} \\ \frac{\partial a}{\partial Cdc} & \frac{\partial a}{\partial LDP} & \frac{\partial a}{\partial Vb} \\ \frac{\partial b}{\partial Cdc} & \frac{\partial b}{\partial LDP} & \frac{\partial b}{\partial Vb} \end{pmatrix}_{(Cdc(k),LDP(k),Vb(k))} \quad (9)$$

For a primary color, the expression in this manner is possible. However, a combined color is expressed by Equation (10), which is not of a block diagonal form.

$$\begin{cases} L = L(Cdc^M, LDP^M, Vb^M, Cdc^C, LDP^C, Vb^C, Cdc^Y, LDP^Y, Vb^Y, Cdc^K, LDP^K, Vb^K) \\ a = a(Cdc^M, LDP^M, Vb^M, Cdc^C, LDP^C, Vb^C, Cdc^Y, LDP^Y, Vb^Y, Cdc^K, LDP^K, Vb^K) \\ b = b(Cdc^M, LDP^M, Vb^M, Cdc^C, LDP^C, Vb^C, Cdc^Y, LDP^Y, Vb^Y, Cdc^K, LDP^K, Vb^K) \end{cases} \quad (10)$$

In this way, a printout color of a combined color varies depending on 12-dimensional setting values. More specifically, a printout color of a primary color is determined by the three setting values u=(Cdc, LDP, and Vd) for a corresponding one of the image forming units. Accordingly, the multivariable function y=G(u), variables which depends on does not include time, can be determined by carrying out an experiment to measure a printout color for each of combinations of the three setting values. However, for the combined colors, because the number of combinations of the 12 setting values is extremely large, it is impracticable to carry out such an experiment.

This problem can be solved by utilizing a color mixing model, such as a Neugebauer equation. For simplification, it is assumed that there are three image forming units for cyan, magenta, and yellow. If RGB reflectances or XYZ tristimulus values of a color generated by mixing the three colors are put as a vector x, x is expressed as equation (11) by using Neugebauer equation:

$$\begin{aligned} x &= A_w x_w + A_c x_c + A_m x_m + A_y x_y + A_r x_r + A_g x_g + A_b x_b + A_{3p} x_{3p} \\ &= (1-a_c)(1-a_m)(1-a_y)x_w + a_c(1-a_m)(1-a_y)x_c + (1-a_c)a_m(1-a_y)x_m + (1-a_c)(1-a_m)a_y x_y + \\ &\quad (1-a_c)a_m a_y x_r + a_c(1-a_m)a_y x_g + a_c a_m(1-a_y)x_b + a_c a_m a_y x_{3p} \end{aligned} \quad (11)$$

In this equation, A is a weighting factors, and $x_w$ is (reflectances/tristimulus values) of paper, $x_c$ is (reflectances/tristimulus values) of cyan, $x_m$ is (reflectances/tristimulus values) of magenta, $x_y$ is (reflectances/tristimulus values) of yellow, $x_r$ is (reflectances/tristimulus values) of magenta-yellow overlap, $x_g$ is (reflectances/tristimulus values) of cyan-yellow overlap, $x_b$ is (reflectance/tristimulus values) of magenta-cyan overlap, and $x_{3p}$ is (reflectance/tristimulus values) of three-color overlap. In Equation (11), each of $a_c$, $a_m$, and $a_y$ is area coverage by a corresponding one of the three colors (cyan, magenta, and yellow) per unit area.

When a×b and a/b are defined as vectors composed of a product and a quotient between respective corresponding components of two vectors $a=(a_1, a_2, a_3)$ and $b=(b_1, b_2, b_3)$, respectively, or, more specifically, defined such that $a\times b=(a_1\cdot b_1, a_2\cdot b_2, a_3\cdot b_3)$ and $a/b=(a_1/b_1, a_2/b_2, a_3/b_3)$, Equation (12) below can be obtained using Pollak's approximation. Note that "*" in Equation (12) is not a wildcard symbol but is a multiplication sign having the same meaning as "x". To avoid confusion with a letter "x", "*" is used in lieu of "x".

$$x_r = x_w*(x_m/x_w)*(x_y/x_w)$$

$$x_g = x_w*(x_c/x_w)*(x_y/x_w)$$

$$x_b = x_w*(x_c/x_w)*(x_m/x_w)$$

$$x_{3p} = x_w*(x_c/x_w)*(x_m/x_w)*(x_y/x_w) \quad (12)$$

Hence, the Neugebauer equation can be expressed by Equation (13).

$$x = x_w*\{1-a_c+a_c(x_c/x_w)\}*\{1-a_m+a_m(x_m/x_w)\}*\{1-a_y+a_y(x_y/x_w)\} \quad (13)$$

Also in Equation (13), "*" is a multiplication sign.

Such analysis can be extended to a situation where four image forming units, including an image forming unit for black (K), are used. When RGB reflectances or XYZ tristimulus values of a color generated by mixing the four primary colors are put as a vector x, x expressed by using Neugebauer equation is:

$$x = x_w*\{1-a_c+a_c(x_c/x_w)\}*\{1-a_m+a_m(x_m/x_w)\}*\{1-a_y+a_y(x_y/x_w)\}+\{1-a_k+a_k(x_k/x_w)\} \quad (14)$$

where "*" is a multiplication sign, and $a_c$ and $x_k$ are area coverage by black (K) and (reflectance/tristimulus values), respectively.

Each of $x_c$, $x_m$, $x_y$, and $x_k$, or (reflectances/tristimulus values) of a corresponding one of the four primary colors, is determined from setting values for a corresponding one of the image forming units C, M, Y, and K. The setting values are: $u^C=(Cdc^C, LDP^C, Vd^C)$, $u^M=(Cdc^M, LDP^M, Vd^M)$, $u^Y=(Cdc^Y, LDP^Y, Vd^Y)$, and $u^K=(Cdc^K, LDP^K, Vd^K)$.

$$x_c=(u^c,u^m,u^y,u^k)=x_c(u^c)$$

$$x_m=(u^c,u^m,u^y,u^k)=x_m(u^c)$$

$$x_y=(u^c,u^m,u^y,u^k)=x_y(u^c)$$

$$x_k=(U^c,u^m,u^y,u^k)=x_k(u^c) \tag{15}$$

Meanwhile, $x_w$, or (reflectances/tristimulus values), of paper is image-forming-independent. In contrast, x, or (reflectances/tristimulus values), of an arbitrary color is a function of ($u^C$, $u^M$, $u^Y$, $u^K$), and thus can be expressed as:

$$x(u^c,u^m,u^y,u^k)=x_w*\{1-a_c+a_c(x_c(u^c)/x_w)\}*\{1-a_m+a_m(x_m(u^m)/x_w)\}*\{1-a_y+a_y(x_y(u^y)/x_w)\}*\{1-a_k+a_k(x_k(u^k)/x_w)\} \tag{16}$$

where "*" is a multiplication sign.

Subsequently, a mathematical model describing the relationship between correction amounts for the various control parameters and a printout color (reflectances/tristimulus values) of an arbitrary color is formulated by using Equation (15). An expression of L*a*b* values of N, which is an arbitrary number, colors in the LPV system is given by:

$$y(k+1) = y(k) + \begin{pmatrix} B_1^c(k) & B_1^m(k) & B_1^y(k) & B_1^k(k) \\ B_2^c(k) & B_2^m(k) & B_2^y(k) & B_2^k(k) \\ \vdots & \vdots & \vdots & \vdots \\ B_N^c(k) & B_N^m(k) & B_N^y(k) & B_N^k(k) \end{pmatrix} v(k) + d(k), \tag{17}$$

where the vector y(k) is a vector, in which L*a*b* values of colors yj(k) (j=1, 2, . . . , N) of the kth print step are arranged.

$$y(k) = \begin{pmatrix} y_1(k) \\ y_2(k) \\ \vdots \\ y_N(k) \end{pmatrix}, y_j(k) \begin{pmatrix} L_j(k) \\ a_j(k) \\ b_j(k) \end{pmatrix} \tag{18}$$

A vector v(k) is a difference of vector u(k), in which setting values for the four image forming units for the kth print step are arranged.

$$v(k) = u(k) - u(k-1),\ u(k) = \begin{pmatrix} u^c(k) \\ u^m(k) \\ u^y(k) \\ u^k(k) \end{pmatrix},\ u^c(k) = \begin{pmatrix} Cdc^c(k) \\ LDP^c(k) \\ Vb^c(k) \end{pmatrix}, \tag{19}$$

$$u^m(k) = \begin{pmatrix} Cdc^m(k) \\ LDP^m(k) \\ Vb^m(k) \end{pmatrix},\ u^y(k) = \begin{pmatrix} Cdc^y(k) \\ LDP^y(k) \\ Vb^y(k) \end{pmatrix},$$

$$u^k(k) = \begin{pmatrix} Cdc^k(k) \\ LDP^k(k) \\ Vb^k(k) \end{pmatrix}$$

The matrix B(k) is a Jacobian matrix of L*a*b* values of each of the colors $y_j(k)$ (j=1, 2, . . . , N).

$$B_j^c(k) = \left.\frac{\partial y_j}{\partial u^c}\right|_{u^c=u^c(k)} = \tag{20}$$

$$\begin{pmatrix} \frac{\partial L_j}{\partial u^c} \\ \frac{\partial a_j}{\partial u^c} \\ \frac{\partial b_j}{\partial u^c} \end{pmatrix}_{u^c=u^c(k)} = \begin{pmatrix} \frac{\partial L_j}{\partial Cdc^c} & \frac{\partial L_j}{\partial LDP^c} & \frac{\partial L_j}{\partial Vb^c} \\ \frac{\partial a_j}{\partial Cdc^c} & \frac{\partial a_j}{\partial LDP^c} & \frac{\partial a_j}{\partial Vb^c} \\ \frac{\partial b_j}{\partial Cdc^c} & \frac{\partial b_j}{\partial LDP^c} & \frac{\partial b_j}{\partial Vb^c} \end{pmatrix}_{u^c=u^c(k)}$$

$$B_j^m(k) = \left.\frac{\partial y_j}{\partial u^m}\right|_{u^m=u^m(k)} =$$

$$\begin{pmatrix} \frac{\partial L_j}{\partial u^m} \\ \frac{\partial a_j}{\partial u^m} \\ \frac{\partial b_j}{\partial u^m} \end{pmatrix}_{u^m=u^m(k)} = \begin{pmatrix} \frac{\partial L_j}{\partial Cdc^m} & \frac{\partial L_j}{\partial LDP^m} & \frac{\partial L_j}{\partial Vb^m} \\ \frac{\partial a_j}{\partial Cdc^m} & \frac{\partial a_j}{\partial LDP^m} & \frac{\partial a_j}{\partial Vb^m} \\ \frac{\partial b_j}{\partial Cdc^m} & \frac{\partial b_j}{\partial LDP^m} & \frac{\partial b_j}{\partial Vb^m} \end{pmatrix}_{u^m=u^m(k)}$$

$$B_j^y(k) = \left.\frac{\partial y_j}{\partial u^y}\right|_{u^y=u^y(k)} =$$

$$\begin{pmatrix} \frac{\partial L_j}{\partial u^y} \\ \frac{\partial a_j}{\partial u^y} \\ \frac{\partial b_j}{\partial u^y} \end{pmatrix}_{u^y=u^y(k)} = \begin{pmatrix} \frac{\partial L_j}{\partial Cdc^y} & \frac{\partial L_j}{\partial LDP^y} & \frac{\partial L_j}{\partial Vb^y} \\ \frac{\partial a_j}{\partial Cdc^y} & \frac{\partial a_j}{\partial LDP^y} & \frac{\partial a_j}{\partial Vb^y} \\ \frac{\partial b_j}{\partial Cdc^y} & \frac{\partial b_j}{\partial LDP^y} & \frac{\partial b_j}{\partial Vb^y} \end{pmatrix}_{u^y=u^y(k)}$$

$$B_j^k(k) = \left.\frac{\partial y_j}{\partial u^k}\right|_{u^k=u^k(k)} =$$

$$\begin{pmatrix} \frac{\partial L_j}{\partial u^k} \\ \frac{\partial a_j}{\partial u^k} \\ \frac{\partial b_j}{\partial u^k} \end{pmatrix}_{u^k=u^k(k)} = \begin{pmatrix} \frac{\partial L_j}{\partial Cdc^k} & \frac{\partial L_j}{\partial LDP^k} & \frac{\partial L_j}{\partial Vb^k} \\ \frac{\partial a_j}{\partial Cdc^k} & \frac{\partial a_j}{\partial LDP^k} & \frac{\partial a_j}{\partial Vb^k} \\ \frac{\partial b_j}{\partial Cdc^k} & \frac{\partial b_j}{\partial LDP^k} & \frac{\partial b_j}{\partial Vb^k} \end{pmatrix}_{u^k=u^k(k)}$$

By calculating each of elements in Equation (20), a mathematical model (Equation (17)) describing the relationship between correction amounts for the control parameters and a printout color (reflectances/tristimulus values) of an arbitrary color can be formulated. Methods of calculating the elements in Equation (20) are discussed below.

The elements in the Jacobian matrix can be expressed based on Equation (16). For instance, elements for cyan (C) can be expressed by:

$$\begin{aligned} \frac{\partial L}{\partial u^c} &= \frac{\partial L}{\partial X}\frac{\partial X}{\partial u^c} + \frac{\partial L}{\partial Y}\frac{\partial Y}{\partial u^c} \\ &= a_X\frac{\partial L}{\partial X}\frac{dX_c(u^c)}{du^c} + a_Y\frac{\partial L}{\partial Y}\frac{dY_c(u^c)}{du^c} + a_Z\frac{\partial L}{\partial Z}\frac{dZ_c(u^c)}{du^c} \end{aligned} \tag{21}$$

$$\begin{aligned} \frac{\partial a}{\partial u^c} &= \frac{\partial a}{\partial X}\frac{\partial X}{\partial u^c} + \frac{\partial a}{\partial Y}\frac{\partial Y}{\partial u^c} + \frac{\partial a}{\partial Z}\frac{\partial Z}{\partial u^c} \\ &= a_X\frac{\partial a}{\partial X}\frac{dX_c(u^c)}{du^c} + a_Y\frac{\partial a}{\partial Y}\frac{dY_c(u^c)}{du^c} + a_Z\frac{\partial a}{\partial Z}\frac{dZ_c(u^c)}{du^c} \end{aligned}$$

-continued $$\frac{\partial L}{\partial u^c} = \frac{\partial b}{\partial X}\frac{\partial X}{\partial u^c} + \frac{\partial b}{\partial Y}\frac{\partial Y}{\partial u^c} + \frac{\partial a}{\partial Z}\frac{\partial Z}{\partial u^c} = a_X\frac{\partial b}{\partial X}\frac{dX_c(u^c)}{du^c} + a_Y\frac{\partial b}{\partial Y}\frac{dY_c(u^c)}{du^c} + a_Z\frac{\partial b}{\partial Z}\frac{dZ_c(u^c)}{du^c},$$

where $\alpha_x$, $\alpha_y$, and $\alpha_z$ are given by:

$$\begin{cases} a_x \equiv a_c\left(1 - a_m + a_m\frac{X_m}{X_w}\right)\left(1 - a_y + a_y\frac{X_y}{X_w}\right)\left(1 - a_k + a_k\frac{X_k}{X_w}\right) \\ a_r \equiv a_c\left(1 - a_m + a_m\frac{Y_m}{Y_w}\right)\left(1 - a_y + a_y\frac{Y_y}{Y_w}\right)\left(1 - a_k + a_k\frac{Y_k}{Y_w}\right) \\ a_z \equiv a_c\left(1 - a_m + a_m\frac{Z_m}{Z_w}\right)\left(1 - a_y + a_y\frac{Z_y}{Z_w}\right)\left(1 - a_k + a_k\frac{Z_k}{Z_w}\right). \end{cases} \quad (22)$$

Partial differential of L, a, and b with respect to X, Y, and Z can be calculated using:

$$L = 116 f\left(\frac{Y}{Y_n}\right) = 16, \quad (23)$$

$$a = 500\left\{f\left(\frac{Y}{Y_n}\right) - f\left(\frac{Y}{Y_n}\right)\right\},\ b = 200\left\{f\left(\frac{Y}{Y_n}\right) - f\left(\frac{Z}{Z_n}\right)\right\}$$

$$f(t) = \begin{cases} 7.787t + \frac{16}{116} & 0 \le t \le 0.008856 \\ t^{1/3} & 0.008856 < t \le 1, \end{cases}$$

where $X_n$, $Y_n$, and $Z_n$ are tristimulus values of illumination.

The following vector is determined by carrying out an experiment for a monochrome cyan image and stored in the ROM 405 in advance.

$$\frac{dX_c(u^c)}{du^c},\ \frac{dY_c(u^c)}{du^c},\ \frac{dZ_c(u^c)}{du^c} \quad (24)$$

By using this vector and Equations (22), (23), and (24), Equation (21) can be calculated. Accordingly, calculation of $$B_j^c(k) \quad (25)$$

is achieved.

Similarly, calculation of $$B_j^m(k), B_j^y(k), B_j^k(k) \quad (26)$$

are also achieved. Hence, it has become possible to calculate Equation (17) because all the elements in Equation (20) have been obtained.

The main control unit 50 calculates parameter correction amounts v(k) that allow y(k+1) in Equation (17) to become a target color value, and corrects the various control parameters to values corrected with the parameter correction amounts v(k). By correcting the various control parameters in this manner, a combined color in a suitable color measurement area of a printout image can be reproduced with high accuracy. Furthermore, difference in color tone between a desired combined color and its reproduced color has successfully been greatly reduced regarding not only the combined color in the suitable color measurement area but also the combined color in other areas.

However, when an image to be formed according to an instruction from a user has considerably great variation in color tone, there can be a situation where the image has no suitable color measurement area suitable for color measurement and therefore the color-reproduction-accuracy increasing process cannot be performed. If the situation where the color-reproduction-accuracy increasing process cannot be performed is kept for successive printings of dozens of printouts, color tone of the printouts can be disturbed greatly.

For such a situation where a suitable color measurement area cannot be found in an image represented by the image information, the main control unit 500 performs the deposition-amount stabilizing process rather than the color-reproduction-accuracy increasing process in each printing. The deposition-amount stabilizing process cannot adjust the combined color on a printout to a desired color highly accurately; however, this process can stabilize the combined color at a value that slightly differs from that of the desired color. Accordingly, by performing this process, a serious disturbance in color tone of a printout image can be avoided. More specifically, if no suitable color measurement area is found in an image to be formed according to a request from a user, by performing the deposition-amount stabilizing process rather than the color-reproduction-accuracy increasing process, a serious disturbance in color tone can be avoided.

Experiments carried out by the inventors are described below.

Experiment 1

Comparative Example

An experiment is carried out with a test copier having the same configuration as the copier according to the embodiment. Successive printings of a predetermined test image having a combined color on 500 sheets of the recording paper P are performed. In these successive printings, the color-reproduction-accuracy increasing process is not performed but only the deposition-amount stabilizing process is performed. The deposition-amount stabilizing process is performed on a per-printout-sheet basis. The Y-, C-, M-, and K-toner patch images Py, Pc, Pm, and Pk are formed on an area on the intermediate transfer belt 10 corresponding to an inter-sheet area, in which recording paper is not to be overlaid on the intermediate transfer belt 10. Color measurement on the test image on each of the printout sheets is performed with the line spectrometer 900, and a result of the color measurement is converted into L*a*b* colorimetric system.

Figure 9:
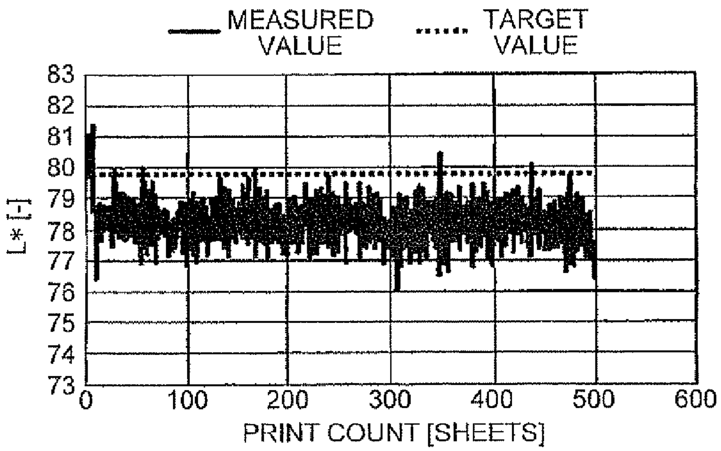
FIG. 9 is a graph illustrating a result of measurement of L* on a test image on each of printouts of Experiment 1 and a target value for L*.

FIG. 9 is a graph illustrating a result of measurement on L* of the test image on each of the printouts of Experiment 1 and a target value for L*. It can be seen that, by performing the deposition-amount stabilizing process, L* is stabilized within a range of approximately from 77 to 79. However, the range where L* is stabilized is slightly lower than 80, which is the target value for L*.

Figure 10:
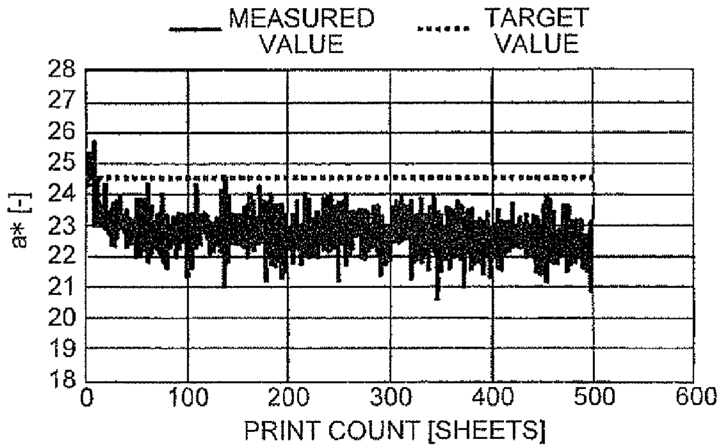
FIG. 10 is a graph illustrating a result of measurement of a* on the test image on each printout of Experiment 1 and a target value for a*.

FIG. 10 is a graph illustrating a result of measurement on a* of the test image on each of the printouts of Experiment 1 and a target value for a*. It can be seen that, by performing the deposition-amount stabilizing process, a* is stabilized within a range of approximately from 21 to 24. However, the range where a* is stabilized is slightly lower than 24.5, which is the target value for a*.

Figure 11:
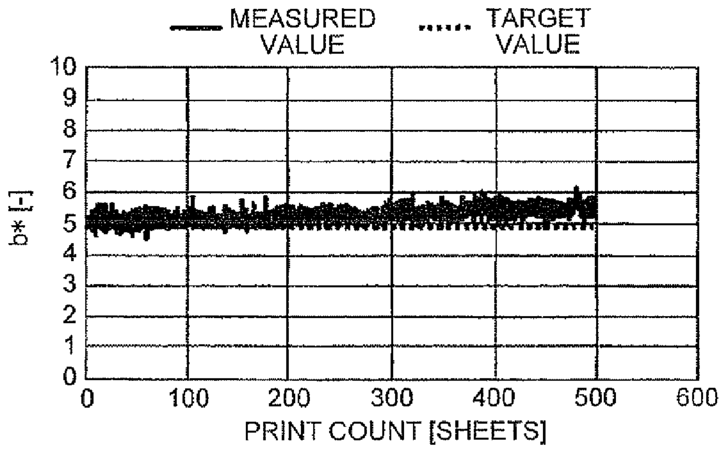
FIG. 11 is a graph illustrating a result of measurement on b* of the test image on each printout of Experiment 1 and a target value for b*.

FIG. 11 is a graph illustrating a result of measurement on b* of the test image on each of the printouts of Experiment 1 and a target value for b*. It can be seen that, by performing the deposition-amount stabilizing process, b* is stabilized within a range of approximately from 5 to 6. However, the target value for b* is 5, which is a lower limit value in the range where b* is stabilized. It is desirable that the target value is at the center of the range.

Figure 12:
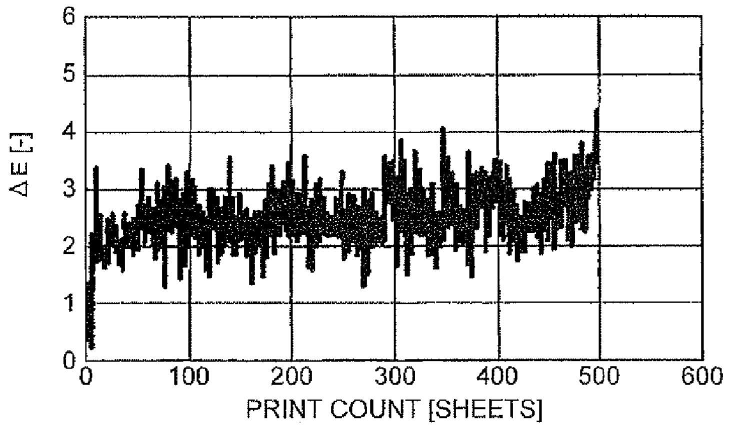
FIG. 12 is a graph illustrating a color difference ΔE between a result of color measurement on the test image on each printout of Experiment 1 and a target color value.

FIG. 12 is a graph illustrating a color difference ΔE between a result of color measurement on the test image on each of the printouts of Experiment 1 and the target color value. The color difference ΔE is computed with an equation: ΔE=(((measured value of L*)−(target value of L*))$^2$+((measured value of a*)−(target value of a*))$^2$+((measured value of b*)−(target value of b*))$^2$)$^{0.5}$. It is desirable that the color difference ΔE stays at around zero; however, the color difference ΔE varies in a range from 0.3 to 2. The color tone is stabilized because this range is relatively narrow but undesirably slightly deviated from the target color tone.

Figure 13:
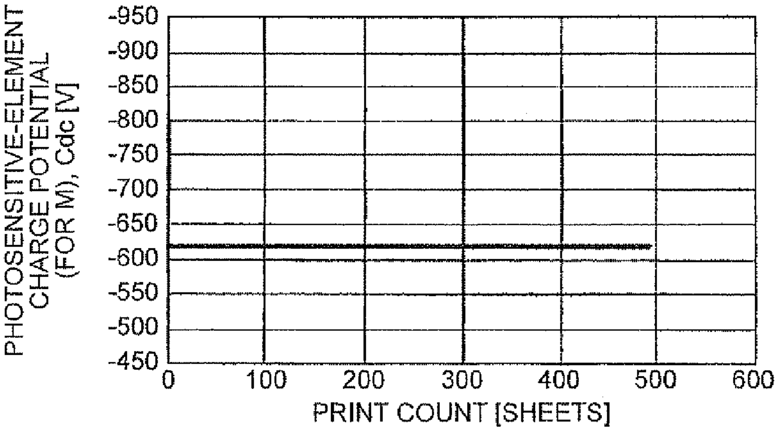
FIG. 13 is a graph illustrating a charge potential, to which a photosensitive element 20M for magenta has been uniformly electrostatically charged, to produce each printout in Experiment 1.

FIG. 13 is a graph illustrating a charge potential, to which the photosensitive element 20M for magenta has been uniformly electrostatically charged to produce each printout in Experiment 1. Referring to FIG. 13, the charge potential, to which the photosensitive element 20M for magenta has been uniformly electrostatically charged to produce each printout, is set to the same value, −600 volts for each printout. The same goes for charge potentials, to which the photosensitive elements 20Y, 20C, and 20K for yellow, cyan, and black are uniformly electrostatically charged.

Figure 14:
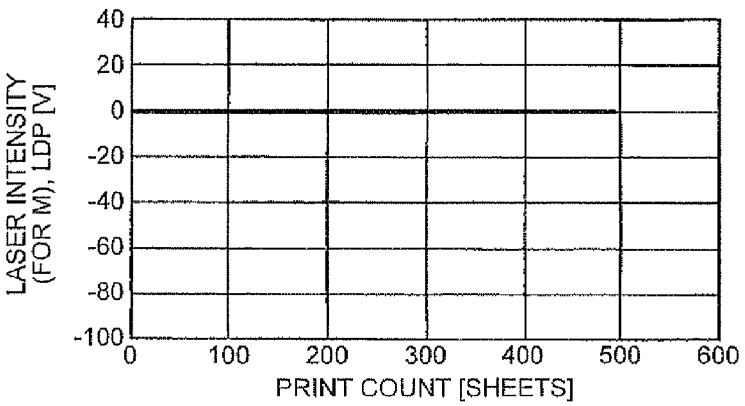
FIG. 14 is a graph illustrating a laser intensity of a laser beam emitted on the photosensitive element 20M for magenta to produce each printout in Experiment 1.

FIG. 14 is a graph illustrating a laser intensity of a laser beam emitted on the photosensitive element 20M for magenta to produce each of the printouts in Experiment 1. Referring to FIG. 14, the laser intensity for the photosensitive element 20M for magenta is set to the same value, zero, for each printout. The same goes for laser intensities for the photosensitive elements 20Y, 20C, and 20K for yellow, cyan, and black. Note that the laser intensity setting values in FIG. 14 are dimensionless parameters used in the test copier and take discrete values in a range from −127 to +127 with "zero" at its center.

Figure 15:
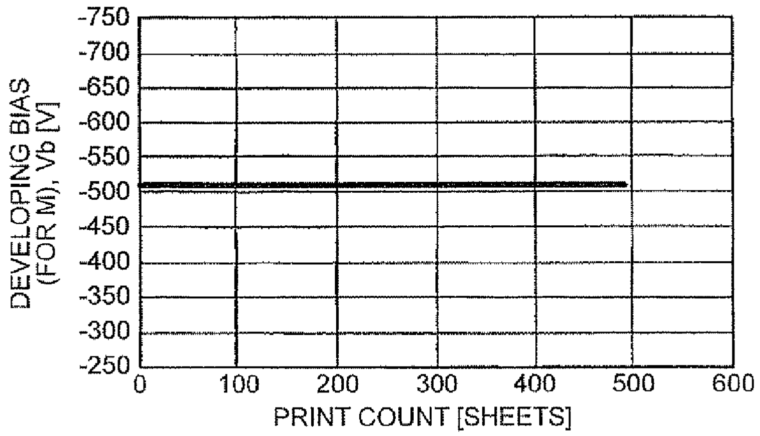
FIG. 15 is a graph illustrating a developing bias Vb for magenta to produce each printout in Experiment 1.

FIG. 15 is a graph illustrating a developing bias Vb for magenta of each printout of Experiment 1. Referring to FIG. 15, the developing bias Vb of the developing device 61M for magenta is set to the same value, −510 volts, for each printout. The same goes for developing biases Vb of the developing devices 61Y, 61C, and 61K for yellow, cyan, and black.

Figure 16:
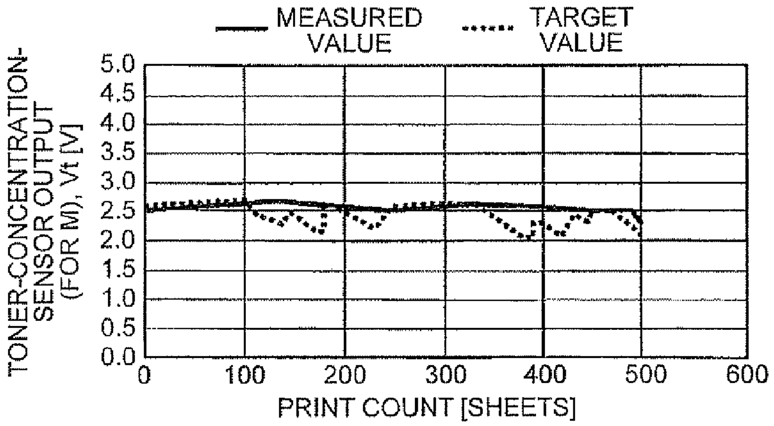
FIG. 16 is a graph illustrating a toner-concentration-sensor output Vt for magenta obtained during producing each printout of Experiment 1.

FIG. 16 is a graph illustrating a toner-concentration-sensor output Vt for magenta obtained from each of the printouts of Experiment 1. As the toner concentration sensor, a permeability sensor, of which output Vt decreases as the M-toner concentration increases, is used. Put another way, when the toner-concentration-sensor output Vt is on the increase in the graph, the M-toner concentration is on the decrease. As presented in FIG. 16, the control target value for the M-toner concentration is corrected by the deposition-amount stabilizing process appropriately. The measured values of the M-toner concentration do not follow the control target value quickly because there is set an upper limit on a supply amount of the M toner to be supplied in a single supply operation. Changes in toner concentration and correction to control target values for the Y, C, and K toners are substantially the same as those of the M toner. Meanwhile, a lower limit for a target output value for the toner-concentration-sensor output Vt, which is the control target value for the toner concentration, is set to 0.5 volt.

Figure 17:
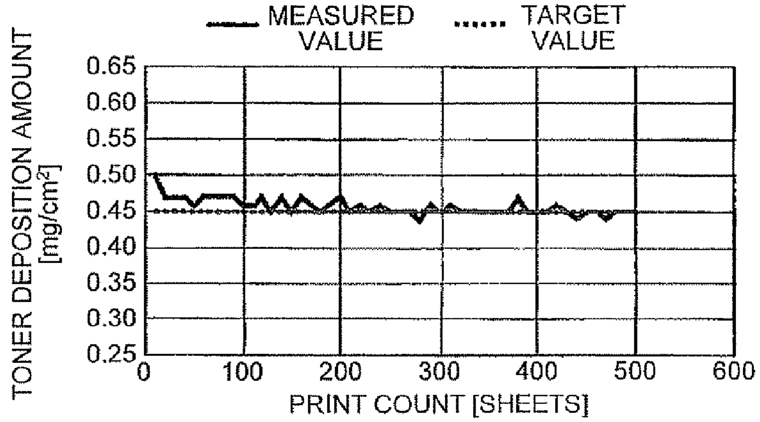
FIG. 17 is a graph illustrating how a toner deposition amount per unit area on an M-toner patch image Pm of Experiment 1 changes with time.

FIG. 17 is a graph illustrating how a toner deposition amount per unit area of the M-toner patch image Pm changes with time. As illustrated in FIG. 17, the toner deposition amount is stabilized at 0.45 mg/cm$^2$, which is substantially equal to the target value, because the deposition-amount stabilizing process has been performed on a per-printout-sheet basis. Similarly, the toner deposition amounts on the Y, C, and K toner patch images Py, Pc, and Pk are also stabilized.

Experiment 2

Embodiment

After performing successive printings of a predetermined first test image having a combined color on 400 sheets of the recording paper P, successive printings of a predetermined second test image having a combined color on 300 sheets of the recording paper P are performed. In each printing, if a suitable color measurement area is found in the image, the color-reproduction-accuracy increasing process is performed, while if a suitable color measurement area is not found in the image, the deposition-amount stabilizing process is performed rather than the color-reproduction-accuracy increasing process. As the first test image, an image including a suitable color measurement area is employed, whereas as the second test image, an image not including a suitable color measurement area is employed. Accordingly, the color-reproduction-accuracy increasing process is performed for each of the first to 400th sheets of printed output, whereas the deposition-amount stabilizing process is performed for each of the 401st to 700th sheets. Even in a situation where the color-reproduction-accuracy increasing process is performed, toner patch images of colors that are unnecessary for the color-reproduction-accuracy increasing process are formed on the inter-sheet corresponding area on the intermediate transfer belt 10 and toner deposition amount s of the toner patch images are measured for reference purpose.

Figure 18:
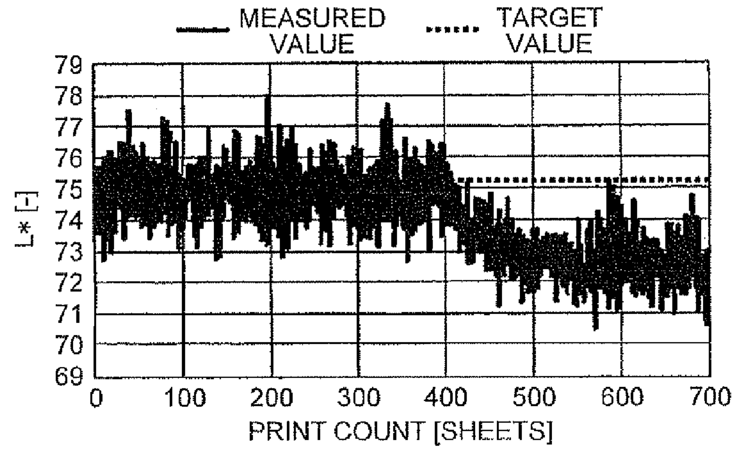
FIG. 18 is a graph illustrating a result of measurement on L* of a test image on each printout of Experiment 2 and a target value for L*.

FIG. 18 is a graph illustrating a result of measurement on L* of a test image on each of the printouts of Experiment 2 and a target value for L*. It is indicated that L* on from the first to 400th sheets is stabilized within a range from 74 to 76 with 75, which is the target value, at its center because the color-reproduction-accuracy increasing process has been performed. Thus, a color tone is successfully stabilized by causing L* to be stabilized within the range from 74 to 76, which is relatively narrow. In addition, this range has the target value at its center. This indicates that the printout color is successfully reproduced in a desired color with high accuracy. In contrast, the range of L* on from the 401st to 700th sheets has shifted to a range from 71 to 73 because the deposition-amount stabilizing process rather than the color-reproduction-accuracy increasing process has been performed. Hence, the color tone is successfully stabilized because the width of the range is similar to that of the first to 400th sheets. However, the printout color on the 401st to 700th sheets slightly differs from the desired color because the center of the range has shifted from 75, which is the target value, to 72.

Figure 19:
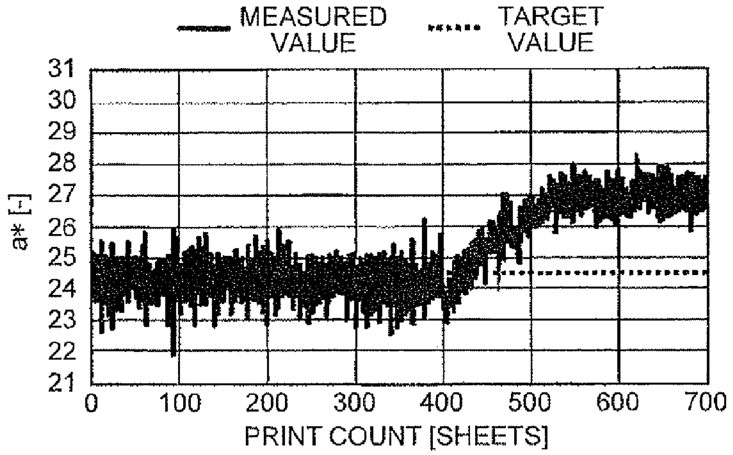
FIG. 19 is a graph illustrating a result of measurement on a* of the test image on each printout of Experiment 2 and a target value for a*.

FIG. 19 is a graph illustrating a result of measurement on a* of the test image on each of the printouts of Experiment 2 and a target value for a*. It is indicated that a* on from the first to 400th sheets is stabilized in a range from 23.5 to 25.5 with 24.5, which is the target value, at its center because the color-reproduction-accuracy increasing process has been performed. Thus, a color tone is successfully stabilized by causing a* to be stabilized within the range from 23.5 to 25.5, which is relatively narrow. Moreover, this range has the target value at its center. This indicates that the printout color is successfully reproduced in a desired color with high accuracy. In contrast, the range of a* on from the 401st to 700th sheets has shifted upward by a substantial degree because the deposition-amount stabilizing process rather than the color-reproduction-accuracy increasing process has been performed. Put another way, the printout color on the 401st to 700th sheets slightly differs from the desired color.

Figure 20:
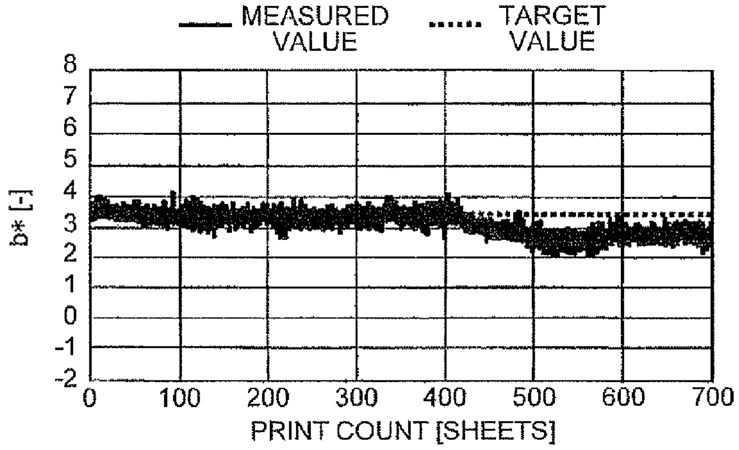
FIG. 20 is a graph illustrating a result of measurement on b* of the test image on each printout of Experiment 2 and a target value for b*.

FIG. 20 is a graph illustrating a result of measurement on b* of the test image on each of the printouts of Experiment 2 and a target value for b*. It is indicated that L* on from the first to 400th sheets is stabilized at around 3.5, which is the target value, because the color-reproduction-accuracy increasing process has been performed. In contrast, the range of b* on from the 401st to 700th sheets is stabilized at around 2.5, which is lower than the target value, because the deposition-amount stabilizing process rather than the color-reproduction-accuracy increasing process has been performed. Put another way, the printout color on the 401st to 700th sheets slightly differs from the desired color.

Figure 21:
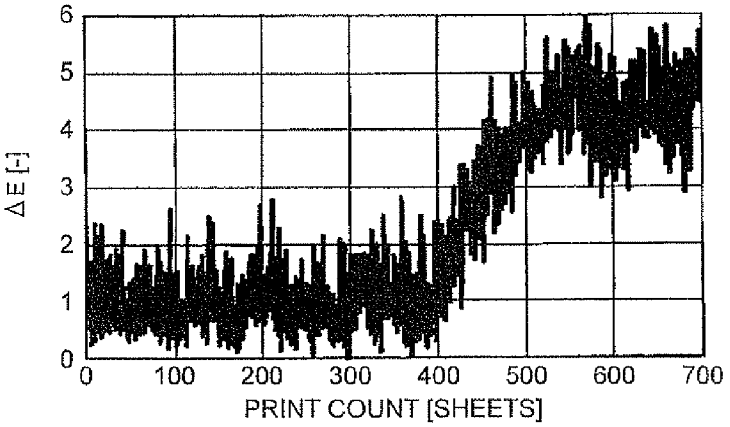
FIG. 21 is a graph illustrating a color difference ΔE between a result of color measurement on the test image on each printout of Experiment 2 and a target color value.

FIG. 21 is a graph illustrating a color difference ΔE between a result of color measurement on the test image on each of the printouts of Experiment 2 and a target color value. It is indicated that the color differences ΔE of from the first to 400th sheets remain in a range from 0.3 to 1.8, which is close to zero, because the color-reproduction-accuracy increasing process has been performed. In contrast, the color differences ΔE of from the 401st to 700th sheets have considerably increased because the deposition-amount stabilizing process rather than the color-reproduction-accuracy increasing process has been performed.

Figure 22:
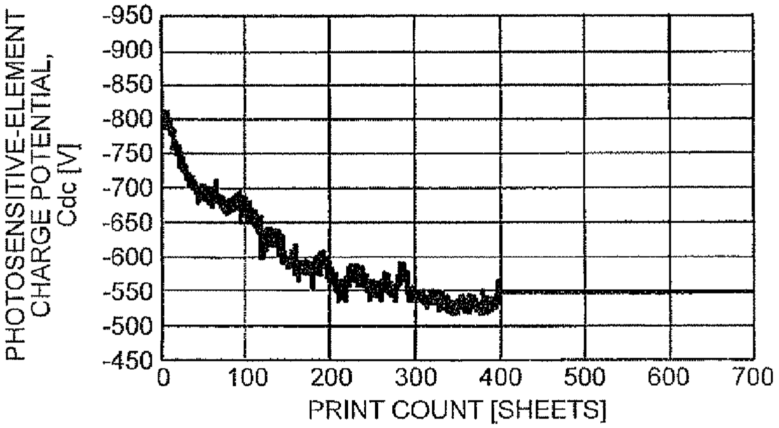
FIG. 22 is a graph illustrating a charge potential, to which a photosensitive element 20M for magenta has been uniformly electrostatically charged, to produce each printout in Experiment 2.

FIG. 22 is a graph illustrating a charge potential, to which a photosensitive element 20M for magenta has been uniformly electrostatically charged to produce each printout in Experiment 2. Referring to FIG. 22, the charge potential for the first to 400th sheets has changed considerably because the color-reproduction-accuracy increasing process has been performed. In contrast, the charge potential for the 401st to 700th sheets is set to the same value, −550 volts, because the deposition-amount stabilizing process rather than the color-reproduction-accuracy increasing process has been performed.

Figure 23:
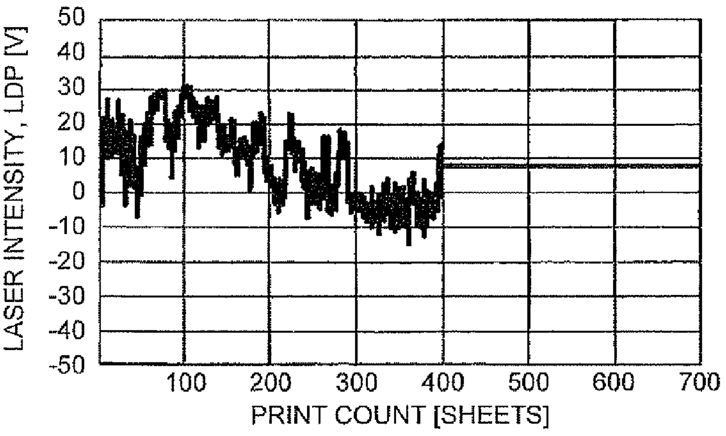
FIG. 23 is a graph illustrating a laser intensity of a laser beam emitted on the photosensitive element 20M for magenta to produce each printout in Experiment 2.

FIG. 23 is a graph illustrating a laser intensity of a laser beam emitted on the photosensitive element 20M for magenta to produce the printouts in Experiment 2. Referring to FIG. 23, the laser intensity for the first to 400th sheets varies widely because the color-reproduction-accuracy increasing process has been performed. In contrast, the laser intensity for the 401st to 700th sheets is set to the same value, 9 volts, because the deposition-amount stabilizing process rather than the color-reproduction-accuracy increasing process has been performed.

Figure 24:
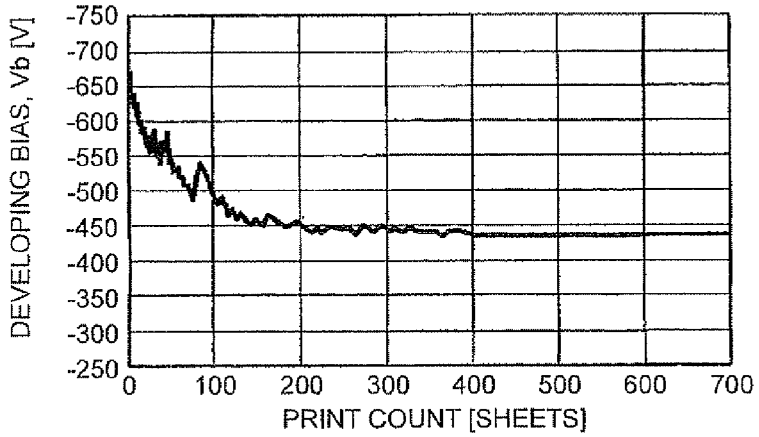
FIG. 24 is a graph illustrating a developing bias Vb for magenta to produce each printout in Experiment 2.

FIG. 24 is a graph illustrating a developing bias Vb for magenta of each printout of Experiment 2. Referring to FIG. 24, the developing bias Vb for the first to 400th sheets has changed considerably because the color-reproduction-accuracy increasing process has been performed. In contrast, the developing bias Vb for the 401st to 700th sheets is set to the same value, −440 volts, because the deposition-amount stabilizing process rather than the color-reproduction-accuracy increasing process has been performed.

Figure 25:
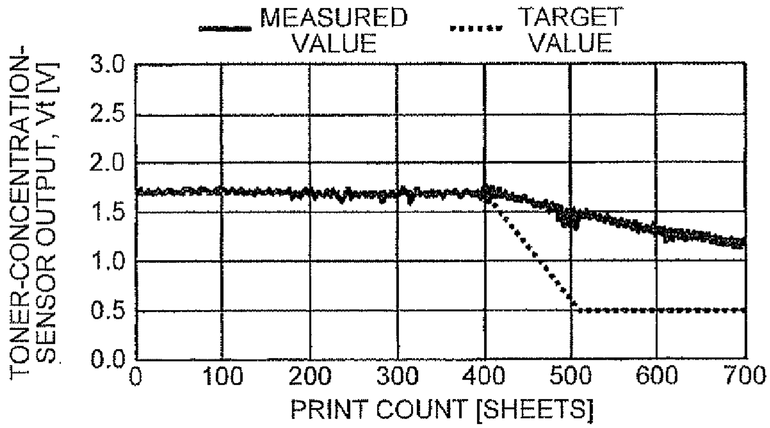
FIG. 25 is a graph illustrating a toner-concentration-sensor output Vt for magenta obtained during producing each printout of Experiment 2.

FIG. 25 is a graph illustrating a toner-concentration-sensor output Vt for magenta obtained from each printout of Experiment 2. Referring to FIG. 25, a target value for the toner-concentration-sensor output Vt for the first to 400th sheets remains invariant because the color-reproduction-accuracy increasing process has been performed. In contrast, the target value for the 401st to 700th sheets has considerably changed because the deposition-amount stabilizing process rather than the color-reproduction-accuracy increasing process has been performed.

Figure 26:
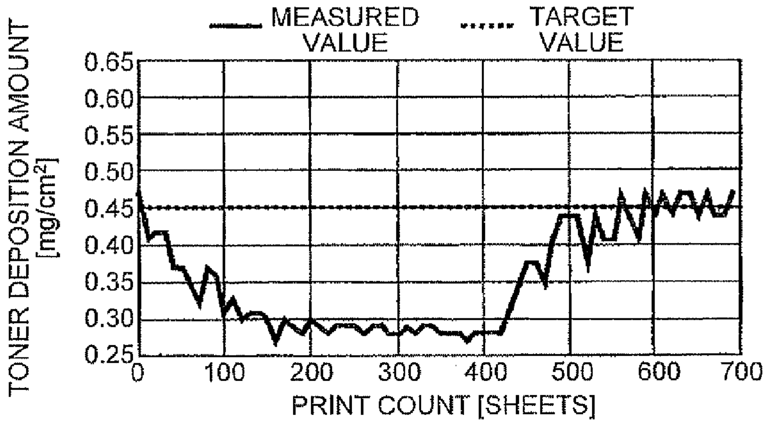
FIG. 26 is a graph illustrating how a toner deposition amount per unit area on an M-toner patch image Pm of Experiment 2 changes with time.

FIG. 26 is a graph illustrating how a toner deposition amount per unit area on the M-toner patch image Pm changes with time. Referring to FIG. 26, the toner deposition amount on the first to 400th sheets has changed considerably because the color-reproduction-accuracy increasing process has been performed. In contrast, the toner deposition amount on the 401st to 700th sheets is stabilized at around 0.45 $mg/cm^2$, which is the target value, because the deposition-amount stabilizing process rather than the color-reproduction-accuracy increasing process has been performed.

As discussed above, it is confirmed that by performing the color-reproduction-accuracy increasing process, a reproduced color tone can be stabilized at substantially the same color tone as that of a desired color with high accuracy, and, by performing the deposition-amount stabilizing process rather than the color-reproduction-accuracy increasing process when an image to be reproduced has no suitable color measurement area, a reproduced color tone can be stabilized although the reproduced color tone slightly differs from that of a desired color.

The copier according to the embodiment includes, as the image forming unit, the photosensitive elements 20Y, 20C, 20M, and 20K serving as a latent-image carrier, the latent-image writing unit 21 serving as a latent-image writing unit that writes latent images on the latent-image carrier, and the developing devices 61Y, 61C, 61M, and 61K serving as a developing unit that develops the latent images carried on the photosensitive element with toner. Accordingly, the copier is capable of forming primary-color toner images through electrophotographic processing.

The main control unit 500, serving as a control unit, of the copier according to the embodiment is configured to correct control parameters, which are charge power of the electrostatically charging unit, intensity of optical writing performed by the latent-image writing unit, and the developing bias, in the color-reproduction-accuracy increasing process. The corrected control parameters allow a reproduced color tone to be stabilized at substantially the same color tone as that of a desired color with high accuracy.

The copier according to the embodiment includes, as each of the developing devices 61Y, 61C, 61M, and 61K, a developing device that develops a latent image with toner that contains toner and carrier. The copier also includes a toner supply unit that feeds toner into the developing devices 61Y, 61C, 61M, and 61K based on a difference between a measurement value of a toner concentration in the developer and a predetermined target concentration value. With this configuration, a toner deposition amount can be adjusted by changing the amount of charge on the toner in the developer by adjusting the target concentration value (target value for the output Vt) to thereby change the amount of charge on the toner in the developer.

The main control unit 500 of the copier according to the embodiment is configured such that in the deposition-amount stabilizing process, if a result of measurement obtained with the optical sensor unit 310, serving as a deposition-amount detecting unit, is lower than a target deposition-amount value, the target value for the toner-concentration-sensor output Vt, which is a charge-level affecting parameter, is corrected to lower a charge level of the toner, while, if the measurement result obtained with the optical sensor unit 310 is higher than the target deposition-amount value, the target value is corrected to increase the charge level. With this configuration, the toner deposition amount can be stabilized by adjusting the charge level.

The main control unit 500 of the copier according to the embodiment is configured such that in deposition-amount stabilizing control, if the measurement result obtained with the optical sensor unit 310 is lower than a target deposition-amount value, the target deposition-amount value, serving as the charge-level affecting parameter, is adjusted to a higher value (by reducing the target value for the output Vt) to lower the charge level, while, if the measurement result obtained with the optical sensor unit 310 is higher than the target deposition-amount value, the target value is corrected to a lower value (by increasing the target value for the output Vt) to increase the charge level. With this configuration, the toner deposition amount can be stabilized by adjusting the deposition-amount target value.

The main control unit 500 of the copier according to the embodiment is configured such that if the main control unit 500, serving as an area searching unit, has found a suitable color measurement area in an image, only the color-reproduction-accuracy increasing process is to be performed among the color-reproduction-accuracy increasing process and the deposition-amount stabilizing process. With this configuration, an unfavorable situation, in which even when a difference between a reproduced color tone and that of a desired color is reduced by the color-reproduction-accuracy increasing process, the difference is widened by the deposition-amount stabilizing process can be avoided because the color-reproduction-accuracy increasing process and the deposition-amount stabilizing process are continuously performed.

According to an aspect of the present invention, by performing a color-reproduction-accuracy increasing process that adjusts control parameters for an image forming unit based on a result of color measurement performed on the suitable color-measurement area of a combined-color toner image formed based on image information, a combined color can be reproduced with high accuracy without producing a printout of a combined-color toner image only for test purpose. Hence, a combined color can be reproduced with high accuracy without forcing a user to sort out a test printout.

If a suitable color measurement area is not found in a combined-color toner image to be formed based on image information, the color-reproduction-accuracy increasing process cannot be performed; in such a case, a deposition-amount stabilizing process, which is conventionally known, rather than the color-reproduction-accuracy increasing process is performed. As discussed above, the deposition-amount stabilizing process cannot adjust a combined color on a printout to a desired color highly accurately; however, this process can cause the combined color to be stabilized at a value that slightly differs from that of the desired color. Accordingly, by performing this process, a serious disturbance in color tone of a printout image can be avoided. More specifically, if a suitable color measurement area cannot be found in an image to be printed under instruction from a user, by performing the deposition-amount stabilizing process in lieu of the color-reproduction-accuracy increasing process, a serious disturbance in color tone can be avoided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image forming apparatus comprising:

an image forming unit that forms multiple primary-color toner images of different primary colors on a surface of a single image carrier or forms primary-color toner images of different primary colors individually on surfaces of a plurality of image carriers;

a transfer unit that brings a contact member into contact with any one of the single image carrier and the plurality of image carriers to create a transfer nip to transfer the multiple primary-color toner images formed on the single image carrier or the primary-color toner images individually formed on the surfaces of the plurality of image carriers on any one of a surface of the contact member and a recording sheet held on the surface of the contact member, thereby obtaining a toner image including a combined-color; and a control unit that controls driving operations of the image forming unit and the transfer unit and performs predetermined computations, wherein the control unit includes:

an area searching unit that searches an image represented by an image information for a suitable color measurement area suitable for color measurement;

a color measuring unit that performs color measurement on the combined-color toner image formed on the one of the contact member and the recording sheet based on the image information; and a deposition-amount detecting unit that measures a toner deposition amount per unit area on each of the primary-color toner images formed by the image forming unit, and the control unit is configured to perform, if the area searching unit has successfully found the suitable color measurement area, a color-reproduction-accuracy increasing process of adjusting a control parameter for the image forming unit so as to reduce a difference between a result of color measurement performed by the color measuring unit and a desired color to thereby increase combined-color reproduction accuracy, while, if the area searching unit has failed to find the suitable color measurement area, to perform a deposition-amount stabilizing process of causing the image forming unit to form a plurality of test primary-color toner images and adjusting a control parameter for the image forming unit so as to reduce a difference between a toner deposition amount on each of the test primary-color toner images measured by the deposition-amount detecting unit and a corresponding target deposition amount to thereby stabilize the toner deposition amount.

2. The image forming apparatus of claim 1, wherein the image forming unit includes:

a latent-image carrier as the image carrier;

a latent-image writing unit that writes a latent image onto the latent-image carrier; and a developing unit that develops the latent image carried by the latent-image carrier with toner.

3. The image forming apparatus of claim 2, wherein the latent-image carrier is a photosensitive element, the latent-image writing unit writes the latent image by optically scanning a surface of the photosensitive element uniformly electrostatically charged by an electrostatically charging unit, the developing unit applies a developing bias onto a surface of a developer carrier that carries a developer on the surface to thereby transfer toner in the developer on the developer carrier onto the electrostatic latent image on the photosensitive element, and the control unit is configured to adjust at least any one of charge power of the electrostatically charging unit, an intensity of optical writing performed by the latent-image writing unit, and the developing bias, as the control parameter in the color-reproduction-accuracy increasing process.

4. The image forming apparatus of claim 3, wherein the developing unit develops the latent image with the developer that contains the toner and carrier, and the image forming apparatus further comprises a toner supply unit that supplies toner into the developing unit according to a difference between a detection result of concentration of the toner in the developer stored in the developing unit and a predetermined target concentration value is provided.

5. The image forming apparatus of claim 4, wherein the control unit is configured such that, in the deposition-amount stabilizing process, if the deposition amount measured by the deposition-amount detecting unit is smaller than the target deposition amount, the control unit lowers charge level of the toner in the developing unit by adjusting a charge-level affecting parameter, the charge-level affecting parameter being the control parameter that affects the charge level, while if the deposition amount measured by the deposition-amount detecting unit is greater than the target deposition amount, the control unit increases the charge level by adjusting the charge-level affecting parameter.

6. The image forming apparatus of claim 5, wherein the control unit is configured such that, in the deposition-amount stabilizing process, if the deposition amount measured by the deposition-amount detecting unit is smaller than the target deposition amount, the control unit lowers the charge level by increasing the target concentration value, the target concentration value being the charge-level affecting parameter, while, if the deposition amount measured by the deposition-amount detecting unit is greater than the target deposition amount, the control unit increases the charge level by lowering the target concentration value.

7. The image forming apparatus of claim 6, wherein the control unit is configured to perform, if the area searching unit has successfully found the suitable color measurement area, only the color-reproduction-accuracy increasing process but not to perform the deposition-amount stabilizing process.

* * * * *